(12) United States Patent
Schlüsselbauer

(10) Patent No.: US 10,252,443 B2
(45) Date of Patent: Apr. 9, 2019

(54) METHOD FOR PRODUCING CONCRETE PIPES HAVING A PLASTIC INNER PIPE

(76) Inventor: Johann Schlüsselbauer, Altenhof (AT)

( * ) Notice: Subject to any disclaimer, the term of this patent is extended or adjusted under 35 U.S.C. 154(b) by 1020 days.

(21) Appl. No.: 13/512,264

(22) PCT Filed: Nov. 26, 2010

(86) PCT No.: PCT/EP2010/007195
§ 371 (c)(1),
(2), (4) Date: Sep. 12, 2012

(87) PCT Pub. No.: WO2011/063979
PCT Pub. Date: Jun. 3, 2011

(65) Prior Publication Data
US 2012/0326353 A1    Dec. 27, 2012

(30) Foreign Application Priority Data

Nov. 27, 2009 (DE) .......... 10 2009 047 251
Aug. 31, 2010 (DE) .......... 10 2010 040 043

(51) Int. Cl.
| | |
|---|---|
| *B28B 21/00* | (2006.01) |
| *F16L 9/08* | (2006.01) |
| *B28B 19/00* | (2006.01) |
| *B28B 21/72* | (2006.01) |
| *F16L 58/10* | (2006.01) |

(52) U.S. Cl.
CPC .......... *B28B 19/0038* (2013.01); *B28B 21/72* (2013.01); *F16L 9/08* (2013.01); *F16L 58/1036* (2013.01)

(58) Field of Classification Search
CPC .............................. B28B 21/905; B28B 21/88

USPC ........................................................... 264/333
See application file for complete search history.

(56) References Cited

U.S. PATENT DOCUMENTS

| | | | | |
|---|---|---|---|---|
| 2,334,509 | A | * | 11/1943 | Reeves ...................... 425/405.1 |
| 3,470,279 | A | * | 9/1969 | Abbott ............................ 264/72 |
| 3,638,433 | A | * | 2/1972 | Sherard ................... E02D 1/04 |
| | | | | 405/50 |

(Continued)

FOREIGN PATENT DOCUMENTS

| | | |
|---|---|---|
| DE | 44 18 370 A1 | 11/1995 |
| JP | 62 071614 A | 4/1987 |

(Continued)

OTHER PUBLICATIONS

English Translation of JP S62-71614A; Translated by FLS, Inc. Mar. 2016; cover and pp. 1-10.*

(Continued)

*Primary Examiner* — Christina Johnson
*Assistant Examiner* — Patrick Butler
(74) *Attorney, Agent, or Firm* — Womble Bond Dickinson (US) LLP

(57) ABSTRACT

Embodiments of a method and a mold for producing a concrete pipe comprising a basic body made of concrete and a plastic inner pipe for conducting a liquid. The method comprises introducing a mold core into the plastic inner pipe, introducing the plastic inner pipe into an outer mold and pouring concrete into an intermediate space between the outer mold and the plastic inner pipe to form the basic body. After the concrete has solidified, the plastic inner pipe remains as inner formwork in the basic body made of concrete and the mold core is removed.

26 Claims, 13 Drawing Sheets

(56) References Cited

U.S. PATENT DOCUMENTS

| | | | | |
|---|---|---|---|---|
| 3,852,930 | A | * | 12/1974 | Naaman .................... 52/664 |
| 5,139,404 | A | * | 8/1992 | Grau .......................... 425/111 |
| 5,679,279 | A | * | 10/1997 | Schmidgall .................. 249/83 |
| 6,540,955 | B1 | * | 4/2003 | Hutchinson et al. ......... 264/519 |
| 2006/0151042 | A1 | * | 7/2006 | Stringfellow et al. ........ 138/125 |
| 2011/0041942 | A1 | | 2/2011 | Bartlechner et al. |
| 2011/0107708 | A1 | * | 5/2011 | Holscher .................... 52/651.01 |

FOREIGN PATENT DOCUMENTS

| | | | |
|---|---|---|---|
| JP | 11 165310 A | | 6/1999 |
| JP | H11-165310 A | * | 6/1999 |
| JP | 2001 219418 A | | 8/2001 |
| WO | WO 2009/112248 A2 | | 9/2009 |
| WO | WO2009/121581 A2 | * | 10/2009 |

OTHER PUBLICATIONS

PCT/EP2010/007195; International Search Report and Written Opinion with English translation of the PCT Search Report, dated Mar. 15, 2011, 12 pages.

\* cited by examiner

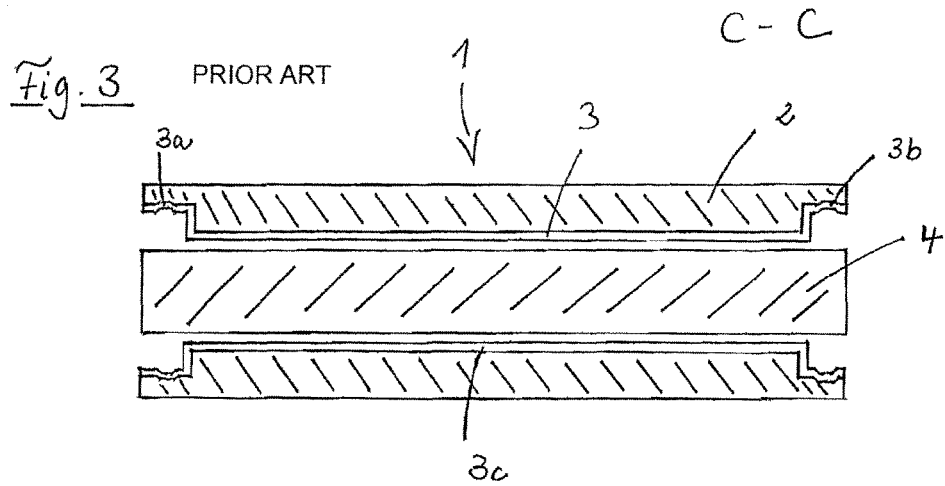
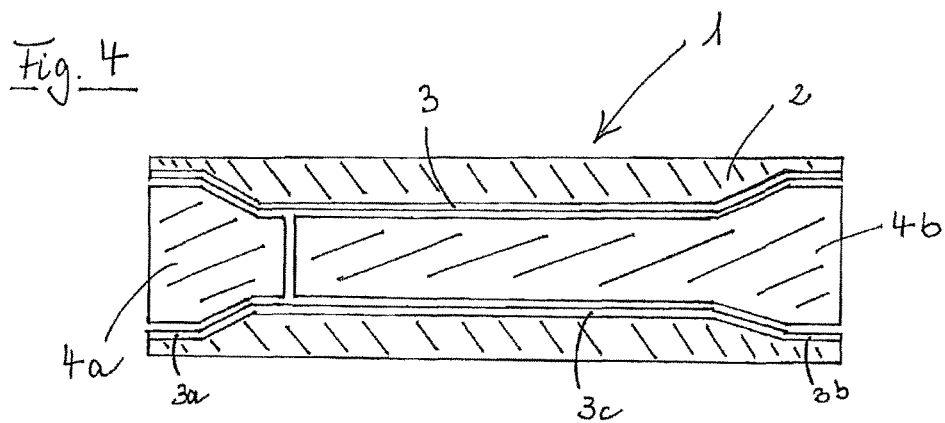
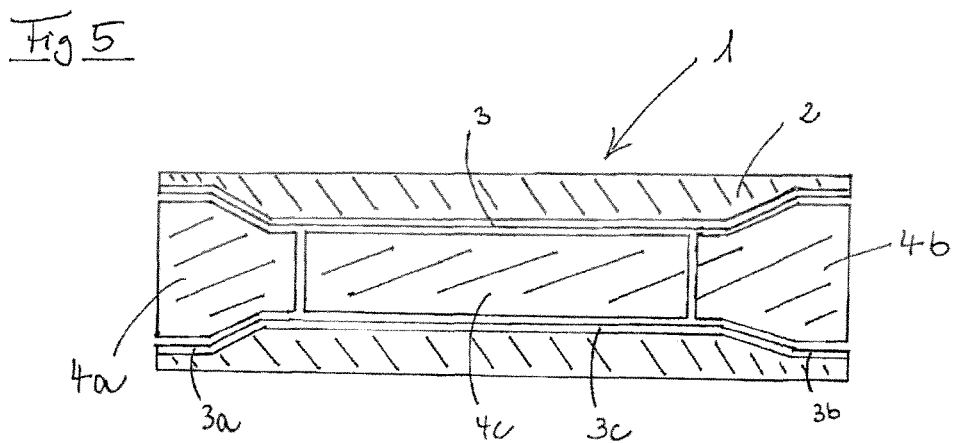

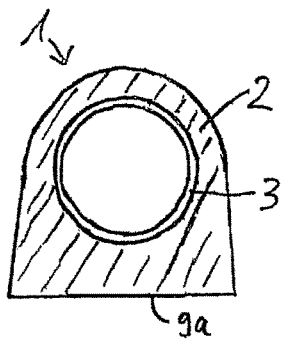
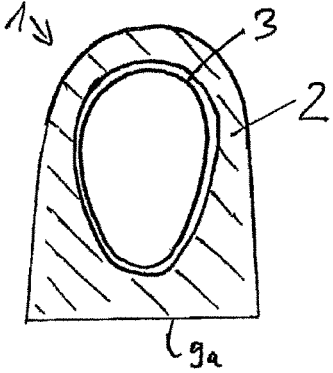
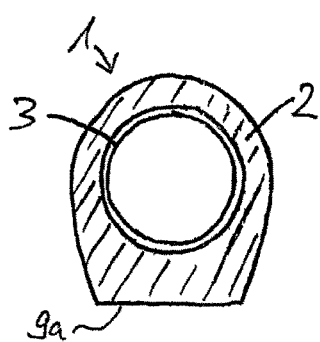
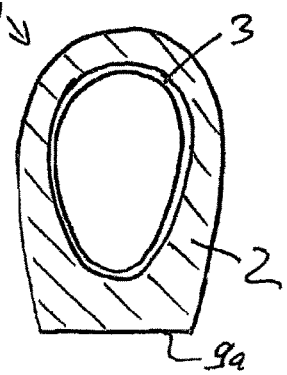
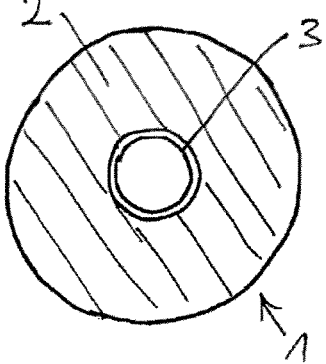
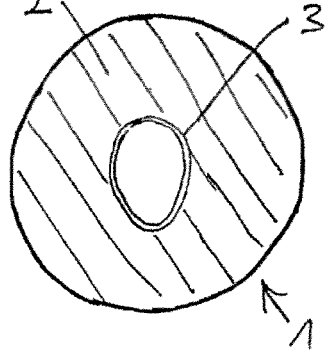

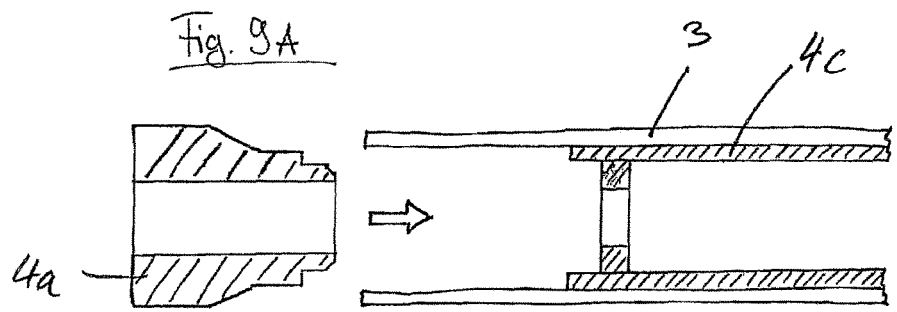
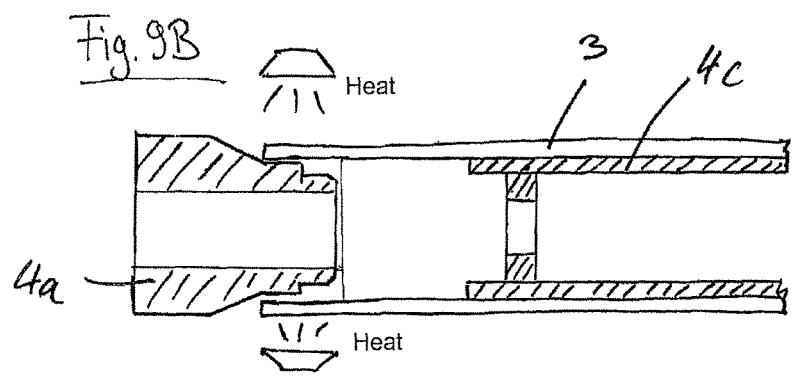
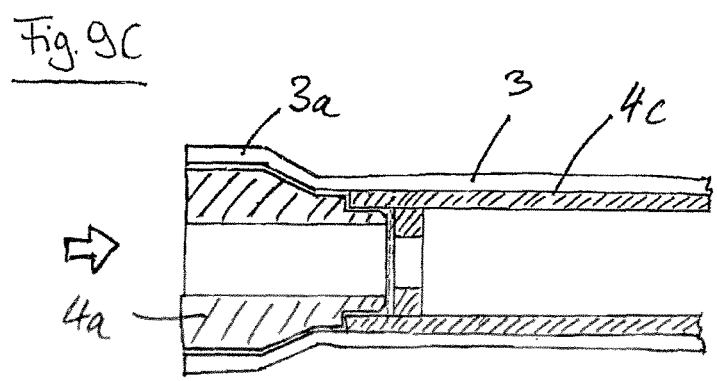

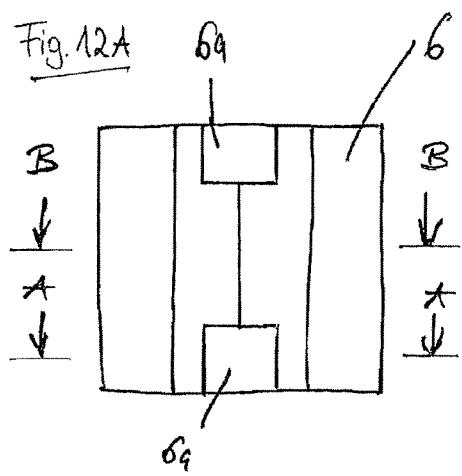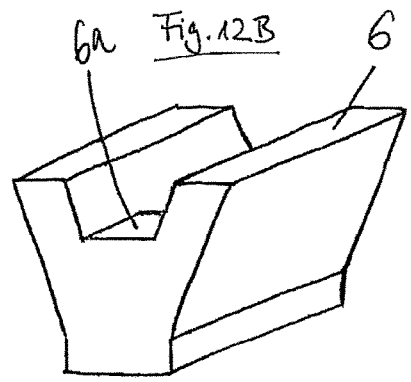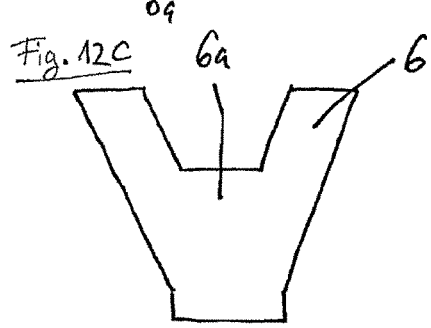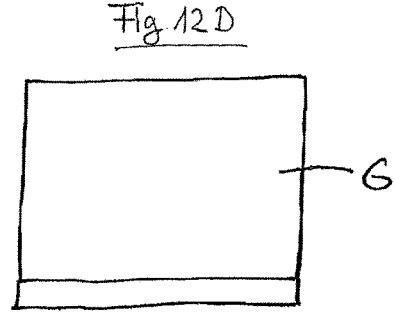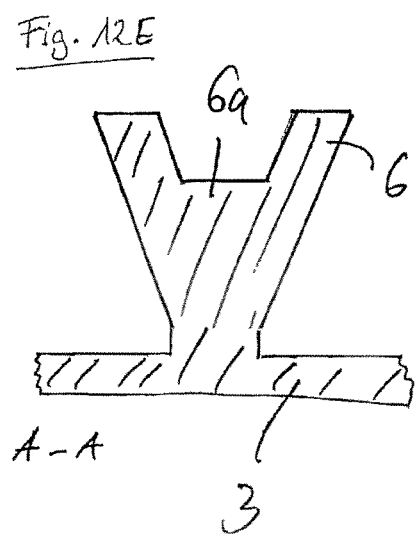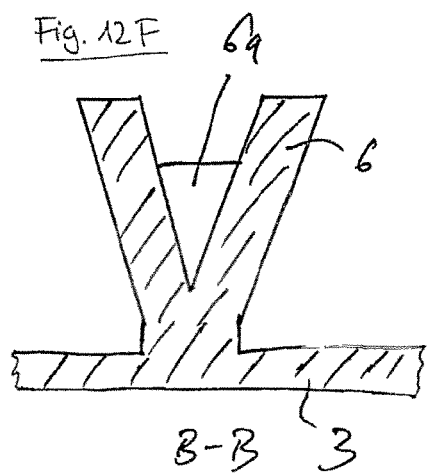

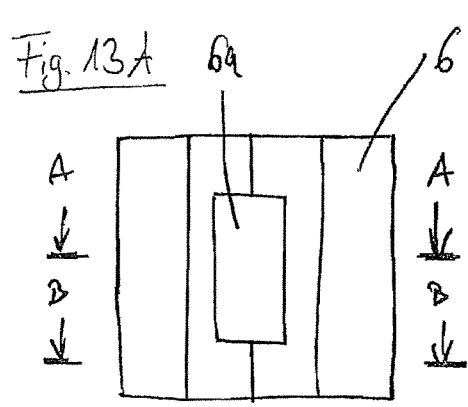
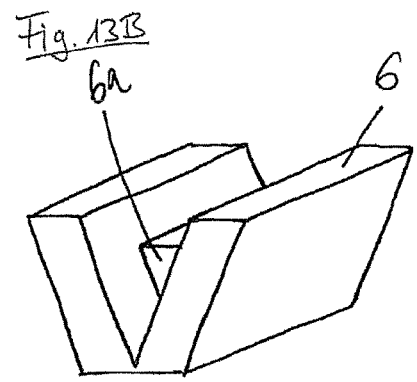
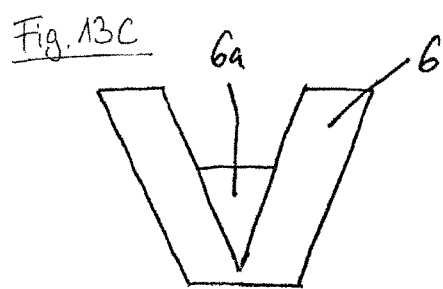
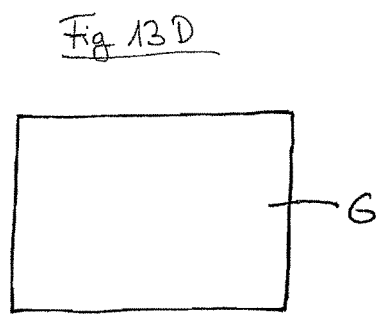
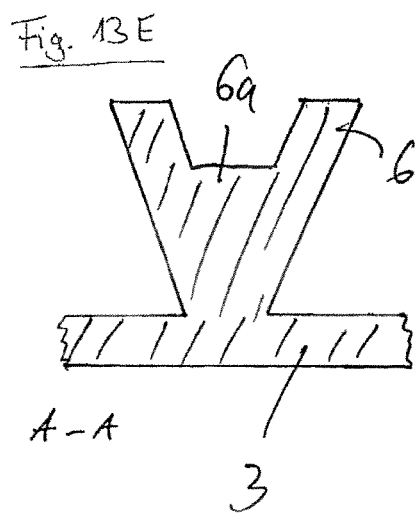
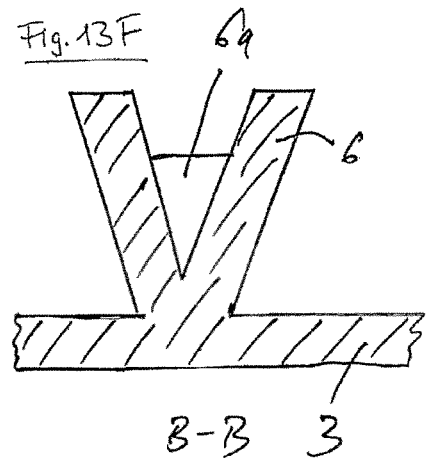

Introducing a mould core

Abutment

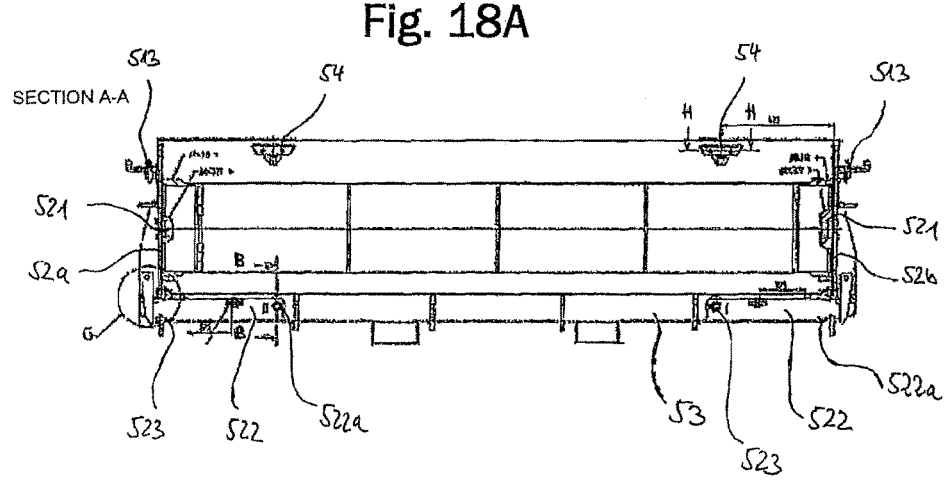
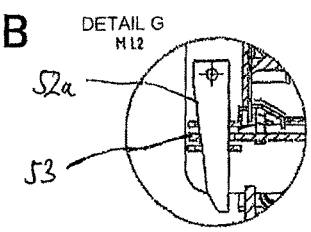
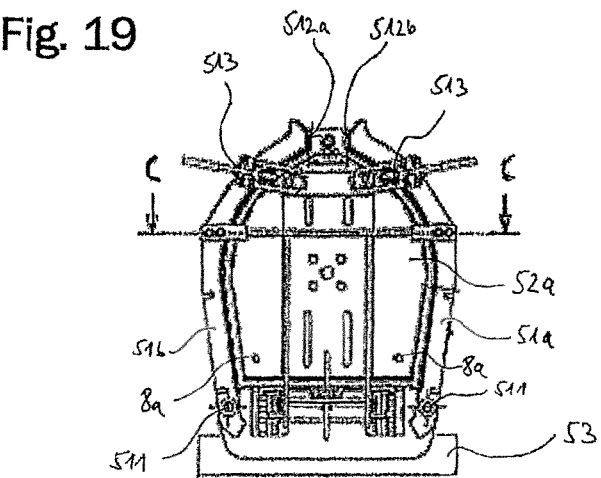

METHOD FOR PRODUCING CONCRETE PIPES HAVING A PLASTIC INNER PIPE

CROSS-REFERENCE TO RELATED APPLICATIONS

This application is the U.S. National Stage entry under 35 U.S.C. § 371 of international application PCT/EP2010/007195, filed 26 Nov. 2010, which in turn claims priority to German patent application DE 10 2010 040 043.2, filed 31 Aug. 2010, and German patent application DE 10 2009 047 251.7, filed 27 Nov. 2009.

BACKGROUND OF THE INVENTION

The invention relates to a method and a mould for producing a concrete pipe which comprises a basic body made of concrete and a plastic inner pipe and which is intended for conducting a liquid, comprising the steps of introducing a mould core into the plastic inner pipe, introducing the plastic inner pipe into an outer mould and pouring concrete, in particular self-compacting concrete, into an intermediate space between the outer mould and the plastic inner pipe in order to form the basic body made of concrete, wherein, after the concrete has solidified, the plastic inner pipe remains as inner formwork in the basic body made of concrete and the mould core is removed after the concrete has at least partially solidified, and wherein the plastic inner pipe comprises an inner section and, at both ends, respective widened sections which have a larger cross section than the inner section.

Such concrete pipes which comprise a basic body made of concrete and a plastic inner pipe and a corresponding manufacturing method for such concrete pipes are known in the art, in particular from WO 2009/112248 A2. FIG. 1 shows by way of example a perspective diagrammatic view of a concrete pipe which is known from the prior art, comprises a basic body made of concrete and a plastic inner pipe and is intended for conducting a liquid. Said figure substantially corresponds to FIG. 1 of WO 2009/112248 A2.

The concrete pipe exemplified in FIG. 1 comprises a basic body 2 which is made of concrete and which has a substantially straight bottom side 9a and two lateral sides 9b and 9c that by way of example initially extend in straight fashion from the bottom side 9a upwards and are then bent towards each other and form a ridge 10 in the centre of the concrete pipe 1. In the area of the ridge 10, holding straps 7 are inserted by way of example in the top side of the concrete pipe 1 as transportation means for the concrete pipe 1. FIG. 1 also shows that the concrete pipe 1 has an inner diameter which is substantially circular in cross section. A corresponding plastic inner pipe 3, a so-called in-liner, is inserted or introduced into the interior of the concrete pipe 1 to protect the concrete pipe from corrosion caused by the liquid to be conducted, e.g. acid-containing waste water. Such plastic inner pipes also provide protection especially above the flow area of the waste water against caustic gases forming in the waste water, acids depositing (e.g. biogenic sulphuric acids) and bacteria which settle on the inner walls and could otherwise attack the inner surface of the concrete above the waste water.

The plastic inner pipe 3 is radially widened in both end regions of the concrete pipe 1 and thus comprises widenings 3a in the end regions. These widenings 3a have a substantially circular cross section which is larger than the cross section of the inner section of the plastic inner pipe 3 and they serve for introducing an intermediate sleeve and/or inner pipe socket into the end-sided widenings 3a of the concrete pipes 1 when two concrete pipes 1 are put together in face-sided or end-sided fashion as intended such that the intermediate sleeve and/or the inner pipe socket extends into both pipes when the ends of the concrete pipes 1 abut.

As also shown in FIG. 1, the two front sides of the concrete pipe 1 are provided by way of example with three supports 8 for bolts to receive the forces between the concrete pipes 1 substantially through the bolts when two concrete pipes 1 are put together in end-sided fashion and to simultaneously ensure a perfect positioning of the concrete pipes 1 relative to each other. This is described in detail in WO 2009/112248 A2.

According to the teaching of WO 2009/112248 A2, such concrete pipes 1 are moulded e.g. horizontally in a trough formwork as the outer mould using self-compacting concrete. According to the general teaching of WO 2009/112248 A2, thick-walled plastic inner pipes 3 are used which serve as sole shaping inner formwork for the concrete pipe 1 in the moulding process. According to a special embodiment of the manufacturing method according to the teaching of WO 2009/112248 A2, however, a mould core 4 is further introduced into the plastic inner pipe before the concrete is poured in order to stabilise and/or support the shape of the plastic inner pipe 3 during moulding. This enables the use of thin-walled plastic inner pipes 3 which would collapse and/or be deformed under the pressure of the concrete without the use of the mould core 4.

FIG. 2 schematically shows a top view of a concrete pipe 1 according to FIG. 1 in a horizontal fashion in an outer mould 5 without end-sided end plate. FIG. 3 schematically shows a longitudinal section (along section line C-C in FIG. 2) through a concrete pipe 1 comprising a basic body 2 made of concrete and a plastic inner pipe 3 according to FIG. 1, wherein a mould core 4 according to the special implementation of the method for producing the concrete pipe is introduced into the concrete pipe according to the teaching of WO 2009/112248 A2. In particular, the mould core 4 according to the teaching of WO 2009/112248 A2 is formed as an expanding core (see also FIG. 2) which consists of a steel or aluminum pipe, for example, which is provided with a longitudinal slot such that the diameter of the expanding core can be enlarged and reduced. The diameter of the expanding core is here enlarged and reduced e.g. by legs which extend to the expanding core centre and which can be reciprocated. The use of an expanding core is, however, very time-consuming and costly.

FIG. 2 and FIG. 3 illustrate the principle of a method for producing a concrete pipe 1 which comprises a basic body 2 made of concrete and a plastic inner pipe 3 and is intended for conducting a liquid, said method comprising the steps of introducing a mould core 4 into the plastic inner pipe 3, introducing the plastic inner pipe 3 into an outer mould 5 and pouring concrete into an intermediate space between the outer mould 5 and the plastic inner pipe 3 to form the basic body 2 made of concrete, wherein the plastic inner pipe 3 is retained as an inner formwork in the basic body 2 made of concrete after the concrete has solidified and the mould core 4 is removed after the concrete has at least partially solidified. The plastic inner pipe 3 comprises an inner section 3c having a substantially circular cross section and, at both ends, respective widened sections 3a and 3b which have a substantially circular cross section which is larger than the cross-section of the inner section 3c.

It is shown in particular in FIG. 3 that the plastic inner pipe 3 has widenings 3a and 3b at its two ends, as described above, wherein the widenings serve for receiving an inner pipe socket and/or an intermediate sleeve when two concrete pipes 1 are put together. The mould core 4, however, has a cylindrical shape over its entire length and thus has a cross section over its entire length which corresponds to the cross section of the inner section 3a of the plastic inner pipe 3. Thus the widenings 3a and 3b are, however, not sealed and concrete can penetrate the widenings 3a and 3b during moulding and has to be subsequently removed in a laborious way. Moreover, it is not possible to use very thin-walled, optionally film-like plastic inner pipes 3, since the widenings 3a and 3b would be deformed by the pressure of the concrete.

It is the object of the present invention to improve the manufacturing method described in WO 2009/112248 A2 for concrete pipes which comprise a basic body made of concrete and a plastic inner pipe and to provide a more advantageous, more efficient and more cost-effective method for producing concrete pipes. In particular, an object of the present invention is in this respect to provide a method for producing a concrete pipe comprising a basic body made of concrete and a plastic inner pipe, which method serves for producing particularly durable concrete pipes having thin-walled plastic inner pipes in a more cost-effective and more efficient way.

SUMMARY OF THE INVENTION

The above-mentioned objects of the invention are achieved according to the invention by a method for producing a concrete pipe which comprises a basic body made of concrete and a plastic inner pipe and which is intended for conducting a liquid according to claim 1. Preferred embodiments of the invention are described by the dependent claims.

A method for producing a concrete pipe which comprises a basic body made of concrete and a plastic inner pipe and which is intended for conducting a liquid according to a first aspect of the present invention comprises the steps of introducing a mould core into the plastic inner pipe, introducing the plastic inner pipe into an outer mould and pouring concrete, in particular self-compacting concrete, into an intermediate space between the outer mould and the plastic inner pipe to form the basic body made of concrete, wherein the plastic inner pipe is retained in the basic body made of concrete as the inner formwork after the concrete has solidified and the mould core is removed after the concrete has at least partially solidified. The plastic inner pipe comprises an inner section, in particular an inner section having a substantially circular cross-section and, at both ends, respective widened sections, in particular radially expanded widened sections which have a larger cross section than the cross section of the inner section.

The present invention is characterized in that the mould core is adapted to the shape of the plastic inner pipe in such a way that an inner section of the mould core substantially has a cross section corresponding to the cross section of the inner section of the plastic inner pipe, a first outer section of the mould core substantially has a cross section corresponding to the cross section of the first widened section at one end of the plastic inner pipe, and a second outer section of the mould core substantially has a cross section corresponding to the cross section of the second widened section at the other end of the plastic inner pipe. It is preferred here that the cross-sections of the first and second widened sections be substantially equal.

In particular, the mould core is at least formed in two parts and a first mould core part of the at least two-part mould core comprises a first outer section of the mould core and a second mould core part of the at least two-part mould core comprises the second outer section of the mould core.

Thus, in contrast to the prior art, particularly in contrast to the teaching of WO 2009/112248 A2, the mould core is formed in several parts. The outer sections of the multi-part mould core are formed by a first mould core part and a second mould core part which substantially have a cross section corresponding to the cross section of the widened sections at the end of the plastic inner pipe and thus in contrast to the prior art the widenings advantageously seal against the penetration of liquid concrete when concrete is poured in. The mould core is thus advantageously adapted to the shape of the plastic inner pipe in the area of the entire plastic inner pipe, and further sealing means in addition to the mould core are not required. In particular, during the moulding step the widened regions of the plastic inner pipe are also advantageously supported and stabilised in shaping fashion against the pressure of the concrete so as to avoid a disadvantageous and undesired deformation of the widened regions at the ends of the plastic inner pipe under the pressure of the concrete.

Since the multi-part mould core according to the present invention is adapted to the cross section of the plastic inner pipe along its entire length, i.e. in particular at the inner section to the cross section of the inner section of the plastic inner pipe and at the ends respectively to the cross section of the widened regions, the plastic inner pipe can thus be advantageously stabilised in shaping fashion and supported along its entire length in accordance with the respective desired cross section.

Furthermore, there is, compared to the prior art, the special advantage that the widenings at the ends of the plastic inner pipe can be moulded, formed or finished directly in the step of introducing the mould core into the plastic inner pipe, in particular when the outer first and/or second mould core part is introduced with the outer sections of the mould core into the plastic inner pipe, e.g. when they are not yet prefabricated or only partially formed in the plastic inner pipe before the concrete pipe is produced.

In particular, this offers the advantage that the shape of the widenings is directly given by the shape of the outer sections of the first and second mould core parts and therefore the mould core parts can be advantageously adapted perfectly to the shape of the widenings during the pouring step in which they stabilise in shaping fashion. Thus, the shape of the opening of the widened regions, preferably the substantially circular shape of the opening of the widened regions, can advantageously be accurately shaped. This is particularly advantageous for carrying out the fitting and sealing as accurately as possible by the intermediate sleeves and/or inner pipe sockets when two concrete pipes are put together.

When the outer mould core parts of the mould core are introduced, the moulding of the widenings at the ends of the plastic inner pipe additionally has the further advantage that a particularly efficient method is provided since a complicated prefabrication of the plastic inner pipe and the forming and/or moulding of the widened regions are not required in the prefabrication.

In the step of pouring concrete into the outer mould, self-compacting concrete is preferably used. However, it is also possible to use conventional concrete, wherein in this case the mould is vibrated after the concrete has been poured in to solidify the concrete. The non-self-compacting concrete can be compacted e.g. via vibrations of the mould core and/or of the outer mould (what is called "vibration compaction"). It is also possible to produce such vibrations serving for compacting the concrete via means contained directly in the concrete, e.g. via so-called bottle vibrators.

The mould core can be formed in two parts, the first or second mould core part preferably comprising substantially the inner section of the mould core. Thus, the mould core substantially comprises a short mould part, which substantially comprises an outer section of the mould core, and a long mould core part which substantially comprises the inner section of the mould core and the other outer section of the mould core.

The advantage is that the inner section of the mould core is formed at the inner section of the plastic inner pipe substantially by a section of a single mould core part and has no connecting faces of two mould core parts. Thus, the inner section of the mould core is particularly stable and can advantageously support and stabilise in a particularly dimensionally stable way the inner section of the plastic inner pipe against the large lifting forces of the concrete.

The inner section of the mould core here preferably has a substantially cylindrical shape. Nevertheless, in spite of the substantially cylindrical shape the inner section can have a minimally tapering, in particular conical, shape or at least comprise a minimally tapering, in particular conical, section. Compared to the substantially cylindrical formation, the minimal taper and/or the minimal conicity is here preferably substantially smaller than or equal to 1 mm per running meter, preferably substantially smaller than or equal to 0.5 mm per running meter. This also enables the usability of the concrete pipe for both directions of flow. The minimum taper facilitates the introduction of the mould core, on the one hand, and in particular the removal from the at least partially solidified mould, on the other hand, i.e. when the mould core is removed. The complicated and expensive use of an expanding core is thus not required.

According to a particularly advantageous embodiment of the method according to the present invention, the mould core is formed in at least three parts and the inner section of the mould core preferably comprises at least one middle third mould core part in addition to the first and second mould core parts.

The advantage is that there is provided another middle third mould core part having a substantially constant cross section corresponding to the cross section of the inner section of the mould core, i.e. substantially corresponding to the inner section of the plastic inner pipe, to support the inner section of the plastic inner pipe in a shaping and stabilizing way. Here, the third mould core part may optionally be introduced into the plastic inner pipe already before the first and second mould core parts are introduced to stabilise in a shaping way the inner section of the plastic inner pipe, wherein the section is longer at the ends of the plastic inner pipe compared to the widened areas, even before the first and second mould core parts are introduced into the plastic inner pipe, optionally for simultaneously forming or moulding the widened sections when these outer mould core parts are introduced. When the inner section of the mould core has substantially been formed by the middle third mould core part, the inner section of the plastic inner pipe can be supported and stabilised in a particularly advantageous fashion by the middle third mould core part against the large lifting forces of the concrete in a dimensionally stable fashion. The at least one middle third mould core part preferably has a substantially cylindrical shape.

Optionally in spite of its substantially cylindrical formation, the third mould core part preferably has a minimally tapering, in particular minimally conical, shape or preferably comprises at least one minimally tapering, in particular minimally conical, section. The advantage is that the middle third mould core part can be placed—the thinner side of the tapering, in particular conical, shape first—into the plastic inner pipe and/or into the inner section of the plastic inner pipe. Here, the minimal conical shape is, however, in particular made in such a way that the middle third mould core part still has a cross section corresponding to the cross section of the inner section of the plastic inner pipe over the entire length. The minimal taper and/or the minimal conicity compared to the substantially cylindrical formation is here preferably substantially smaller than or equal to 1 mm per running meter, preferably substantially smaller than or equal to 0.5 mm per running meter. This also enables the usability of the concrete pipe for both directions of flow. The taper facilitates the introduction of the mould core, as described above, on the one hand, and in particular the removal from the at least partially solidified mould, on the other hand, i.e. when the mould core is removed. The complicated and expensive use of an expanding core is thus not necessary.

In the step of introducing the mould core, an introductory aid mould part is preferably attached to a mould core part of the mould core for introducing the mould core part into the plastic inner pipe, wherein the introductory aid mould part preferably has a tapering shape, in particular a conical shape, and is preferably removed again after the mould core part has been introduced into the plastic inner pipe. Thus, the placement of a mould core part can be further facilitated when the mould core is introduced into the plastic inner pipe.

The plastic inner pipe preferably has a substantially constant cross section before the mould core is introduced into the plastic inner pipe and the step of introducing the mould core into the plastic inner pipe preferably comprises a step of moulding the widened sections at the ends of the plastic inner pipe by means of introducing the outer sections of the mould core.

As already described above, the method according to the present invention advantageously enables the formation or moulding of the radial widened regions at the ends of the plastic inner pipe when the outer mould core parts are introduced during the introduction of mould core. The plastic inner pipe here has a substantially constant cross section before the mould core is introduced, wherein in particular the widenings at the ends of the plastic inner pipe are not yet formed or are only partially formed. As a result of the introduction of the outer mould core parts of the mould core, which have a cross section substantially corresponding to the subsequent cross section of the widenings, the widenings can be formed, moulded and/or finished.

This widening can be made by widening the plastic material by a purely mechanical force application, wherein the avoidance of the back formation of the widened ends of the plastic inner pipe after the pouring step and in particular after the removal of the mould core can be effected by the positive engagement with the concrete of the basic body. The widenings at the ends of the plastic inner pipe are, however, preferably formed thermoplastically in a particularly advantageous manner, wherein before the introduction of the outer mould core parts, however, at least the ends of the plastic inner pipe are heated, e.g. by irradiation with heat or supply of hot air, optionally after the introduction of a central third mould core part, to make the plastic material thermoplastically deformable. Having cooled and removed the core, the widenings then substantially keep the shape as formed.

It is preferred for an inner section of the first and second mould core parts to respectively correspond to an outer section of the inner section of the mould core, i.e. the first and second mould core parts preferably comprise an inner section each, which substantially has a cross section corresponding to the cross section of the inner section of the plastic inner pipe. Each inner section of the first and/or second mould core part preferably merges at a further section—bordering on the inner section—of the first and/or second mould core part in a continuous, in particular conical, way into the respective outer section of the first and/or second mould core part.

The step of introducing the mould core into the plastic inner pipe preferably comprises the steps of introducing the inner section of the first mould core part into the plastic inner pipe at the one end of the plastic inner pipe and/or introducing the inner section of the second mould core part into the plastic inner pipe at the other end of the plastic inner pipe, heating the plastic inner pipe at least at one end into which the inner section of the first mould core part is introduced, and/or heating the plastic inner pipe at least at the other end into which the inner section of the second mould core part is introduced, and introducing the outer section of the first mould core part into the plastic inner pipe to thermoplastically mould the first widened section of the plastic inner pipe at one end after heating and/or introducing the outer section of the second mould core part into the plastic inner pipe to thermoplastically mould the second widened section of the plastic inner pipe at the other end after heating it. The step of heating the plastic inner pipe at the one and/or other end of the plastic inner pipe is preferably carried out here by external and/or internal thermal radiation and/or external and/or internal supply of hot air.

The plastic inner pipe is preferably made of a plastic film which is welded to give the plastic inner pipe, in particular after cutting the plastic film subject to the cross section of the inner section of the plastic pipe. This advantageously enables a high flexibility as regards the production of the plastic inner pipe when a plastic film of a desired film thickness is cut so as to fit to the desired cross section of the plastic inner pipe, wherein the plastic film can be welded in advantageously uniformly sealing manner e.g. along the longitudinal direction of the plastic inner pipe to give the plastic inner pipe.

When the plastic inner pipe is made of a plastic film, the method preferably also comprises the steps of cutting a plastic film subject to the cross section of the inner section of the plastic inner pipe and/or subject to a length of the concrete pipe and welding together the plastic film to give the plastic inner pipe.

Here, the plastic inner film is preferably butt-welded to give the plastic inner pipe. Butt-welding is of advantage in particular when welding takes place directly after the plastic film is cut. However, it is also possible to weld the plastic inner film with overlapping sides to give the plastic inner pipe. The overlapping material can then be removed preferably by fusion or subsequent removal of excessive material. This is of advantage above all when the joining ends of the plastic film are not formed precisely enough or when the plastic film is not welded directly after the cutting step to give the plastic inner pipe since the joining ends of the plastic film tend to minor dimensional changes when stored. Furthermore, welding can also be carried out when material is supplied, e.g. by generating a weld seam.

The plastic inner pipe preferably has a plurality of knobs on the outer surface to anchor the plastic inner pipe after the concrete in the basic body made of concrete has at least partially solidified, in particular before the mould core is removed. The advantage is that the plastic inner pipe is anchored in the desired shape by means of the external knobs when the concrete solidifies in dimensionally stable fashion in the concrete basic body of the concrete pipe and, after the removal of the mould core, is substantially no longer deformed in undesired fashion and in particular retains the desired cross section in the finished concrete pipe. Furthermore, the basic body made of concrete is stabilised by anchorage with the knobs of the plastic inner pipe, and possible subsequent damage of the basic body can be compensated for, which enables a longer durability of the concrete pipe.

The denseness of the knobs, i.e. the denseness of the knobs in a unit proportional to the number of knobs per external unit area of the plastic inner pipe, e.g. knobs per square centimeter, in the region of the ends of the plastic inner pipe, in particular in the region of the widened sections, is preferably greater than the denseness of the knobs in the region of the inner section of the plastic inner pipe. The advantage is that the plastic inner pipe retains the desired cross section in the very region of the widened sections with special accuracy, e.g. with a substantially circular cross section, to enable an accurate fit and seal with an intermediate sleeve and/or an inner pipe socket for putting together two concrete pipes. However, the denseness of the knobs can be reduced at the inner section of the plastic inner pipe so as to save considerable material to reduce the costs.

The knobs preferably have the shape of a mushroom or they have a substantially v-shaped or y-shaped cross section. These knob shape designs are anchored in a particularly advantageous fashion in the concrete of the basic body. For example, when they have a substantially v-shaped or y-shaped cross section, the knobs preferably have one or more cross webs as well. The advantage is that the v-shaped or y-shaped knobs can be anchored in the concrete of the basic body in a better and more durable way.

The step of introducing the mould core into the plastic inner pipe preferably also comprises the step of fixing knobs on the outer surface at least to one end of the plastic inner pipe so as to produce an abutment when the plastic inner pipe is fitted to at least one mould core part of the multi-part mould core, in particular to the middle third mould core part, at the end of the plastic inner pipe and/or when at least one mould core part of the multi-part mould core, in particular of the middle third mould core part, is introduced into the plastic inner pipe at the end of the plastic inner pipe.

Thus, the knobs disposed on the outer surface of the plastic inner pipe offer the additional advantage that they can be used as means for applying or producing a counter-support or abutment when the plastic inner pipe is fitted to a mould core part, e.g. the middle third mould core part, at the end of the plastic inner pipe and/or when a mould core part, e.g. the middle third mould core part, is introduced into the plastic inner pipe at the end of the plastic inner pipe. In particular, it is advantageously possible to use an abutment producing means for fixing the knobs at least on one side of an end of the plastic inner pipe which, at least on one side and at least in part, already substantially provides a cross section corresponding to the cross section of the inner section of the plastic inner pipe and/or e.g. the third mould core part so as to simplify the introduction of the third mould core part.

According to a preferred embodiment of the present invention, which is particularly suitable for producing an advancing concrete pipe, the outer mould is a vertical outer mould in which the concrete pipe is produced in a vertical fashion, wherein the cross section of the outer mould is preferred to be substantially circular, ellipsoidal or oval. In the vertical manufacturing method, the concrete pipe is preferably produced in excessive length and the method preferably comprises a step of facing the concrete pipe to a desired length by cutting off an upper projecting section of the concrete pipe. The advantage is that a projecting section of the concrete pipe and/or a projecting section of the basic body made of concrete can be cut off, in which gas bubbles which rose in the concrete may have collected. When the concrete pipe is produced in a vertical position, a reinforcement can additionally be introduced between the outer mould and the plastic inner pipe, e.g. in the form of a netting, framework or basket design, which is made of steel, for example, to stabilise the basic body made of concrete from inside.

According to an alternative preferred embodiment of the present invention, the outer mould is a horizontal trough formwork in which the concrete pipe is moulded in a horizontal position. The use of a trough formwork as the outer mould is a preferred embodiment of the method according to the invention since the concrete pipe can be produced in a horizontal position in the trough formwork and thus a substantially planar bottom side of the concrete basic body can be formed e.g. in a particularly simple way. The use of a trough formwork as the outer mould is known from WO 2009/112248 A2.

The outer mould and/or in particular the trough formwork is preferably closed on the face side by end walls in the step of introducing the plastic inner pipe into an outer mould, in particular before the concrete is poured in, wherein end walls preferably have respective means for attaching and centering the mould core on the face side in the trough formwork and/or in the outer mould.

According to a further alternative preferred embodiment of the present invention, the outer mould is a horizontal outer mould having longitudinal sides that can be opened and closed, wherein the concrete pipe is moulded in a horizontal fashion when the longitudinal sides are closed or folded in.

The use of a horizontal outer mould having foldable longitudinal sides as the outer mould is a particularly preferred embodiment of the method according to the invention since the concrete pipe can be moulded corresponding to the subsequent installation position of the concrete pipe, i.e. with the tapering sides of the concrete pipe oriented upwards. Thus, a particularly precisely formed bottom side of the concrete basic body can be formed in a particularly simple way since a bottom part of the outer mould can be formed as a precisely formed negative mould of the bottom side of the concrete basic body. In order to remove the concrete pipe from the outer mould, the longitudinal sides can be opened. This is not possible with a one-part trough formwork having fixed side walls as known from WO 2009/112248 A2.

The outer mould is preferably closed with foldable longitudinal sides in the step of introducing the plastic inner pipe into an outer mould on the face side by end walls, wherein the end walls preferably have respective means for centering the mould core.

Fibre concrete is preferably used in the step of pouring concrete into an intermediate space between the outer mould and the plastic inner pipe for forming the basic body. The advantage is that the fibres in the fibre concrete stabilise the basic body made of concrete similar to the effect of a reinforcement in the basic body and render it more resistant to mechanical load.

The cross section of the inner section of the plastic inner pipe and/or of the outer sections of the plastic inner pipe is preferably substantially circular, ellipsoidal or oval.

In particular, it should be noted that the present invention relates to the production of concrete pipes which comprise a basic body made of concrete and a plastic inner pipe and which are suited to conduct a fluid (optionally a gaseous fluid), e.g. in an open channel, i.e. by a gradient, or by pressure in a pressure line (e.g. by means of a pressure pump).

The widened sections preferably have a substantially smooth inner surface and are suited to receive an intermediate sleeve (or an inner pipe socket) which is adapted to the cross section of the widened sections and has a sealing means, in particular a sealing ring, on the outer surface. This is advantageous in particular when the widened sections are directly formed by the direct introduction of the outer mould core parts since the production can thus be simplified as no gasket seats have to be formed in the widened sections as required according to the teaching of WO 2009/112248 A2. A sealing means such as one or more sealing rings can then be provided on an intermediate sleeve which is introduced into the widened sections when two concrete pipes are put together.

According to a second aspect of the present invention, a mould core is provided which is adapted to the mould of a plastic inner pipe in such a way that an inner section of the mould core substantially has a cross section corresponding to the cross section of an inner section of the plastic inner pipe, a first outer section of the mould core has substantially a cross section corresponding to the cross section of a first widened section at one end of the plastic inner pipe and a second outer section of the mould core substantially has a cross section corresponding to the cross section of a second widened section at another end of the plastic inner pipe, wherein the mould core is formed in at least two parts and a first mould core part of the at least two-part mould core comprises the first outer section and a second mould core part of the at least two-part mould core comprises the second outer section. According to preferred embodiments, the mould core can be designed in a way as described in connection with the above-mentioned aspects of the method.

According to a third aspect of the present invention, a mould for producing a concrete pipe which comprises a basic body made of concrete and a plastic inner pipe and is intended for conducting a liquid is provided according to a method of the above described first aspect of the present invention. The mould comprises an outer mould and a mould core, in particular a mould core which is suited to be introduced into a plastic inner pipe.

The mould is characterized in that the mould core is adapted to the shape of the plastic inner pipe in such a way that an inner section of the mould core substantially has a cross section corresponding to the cross section of the inner section of the plastic inner pipe, a first outer section of the mould core substantially has a cross section corresponding to the cross section of the first widened section at the one end of the plastic inner pipe and a second outer section of the mould core substantially has a cross section corresponding to the cross section of the second widened section at the other end of the plastic inner pipe, wherein the mould core is formed in at least two parts and a first mould core part of the at least two-part mould core comprises the first outer section and a second mould core part of the at least two-part mould core comprises the second outer section.

According to a fourth aspect of the present invention there is provided an outer mould of a mould for producing a concrete pipe which comprises a basic body made of concrete and a plastic inner pipe and is intended for conducting a liquid according to a method of the above described first aspect of the present invention.

The preferred features described below relate to the mould of the above-mentioned third aspect of the present invention and the outer mould of the above-mentioned fourth aspect of the present invention.

The outer mould is preferably a horizontal outer mould which has two face-side end walls including means for holding the mould core, two side walls on the long side and a bottom part, wherein the two side walls are preferably attached in folding manner to the bottom part by means of one or more hinges in each case to open and close the outer mould.

Because of the preferred design of the outer mould as an outer mould having folding side walls, the removal of the at least partially solidified concrete pipe can be considerably simplified. The concrete pipe is moulded in the outer mould when the side walls are closed or folded in, and the side walls can be opened when the concrete has at least partially solidified whereupon the at least partially solidified concrete pipe can easily be removed.

When concrete pipes having a base (so-called base pipes) are produced in a horizontal fashion in an upside down installation position, as shown in FIG. 2, for example, and as known from WO 2009/112248 A2, by means of a moulding step using a trough formwork, there is also the drawback that due to the trough shape the width of the trough opening and also the width of the pipe base must correspond at least to the outer diameter of the concrete pipe so that the pipe can be removed from the trough upwards. This wide base, however, hardly improves the statics of the pipe yet it increases the costs and the weight due to the great amount of concrete employed.

As a result of the advantageous solution with an outer mould having folding side walls, the dimensions of the pipe base can be narrower irrespective of the pipe diameter since there is the possibility of enlarging the removal opening by opening the side walls of the outer mould in order to remove the concrete pipe.

When trough formworks are used, it may be that it is difficult to remove the concrete pipes due to the fixed side walls. This might optionally result in a complicated fixing of the outer mould to be able to remove the concrete pipe. When the trough mould shows minor irregularities (e.g. resulting from damage or wear), it is even conceivable that the pipe cannot be removed at all. In this case, the concrete pipe per se and also the outer mould are lost.

Compared to a trough mould an outer mould having folding side walls additionally facilitates the cleaning of the outer mould after the concrete pipe has been removed since concrete residues can be wiped through the slot between the side wall and the bottom part.

In summary, an outer mould having folding side walls enables an advantageous narrower design of the base of the pipe so as to save material and costs and also fundamentally facilitate the removal.

According to a preferred embodiment, at least one of the end walls is attached to the bottom part in folding manner by means of one or more hinges to open and close the face side of the outer mould.

According to an alternative preferred embodiment, at least one of the end walls can be moved for the end-face opening and closing of the outer mould in the longitudinal direction of the outer mould. The at least one movable end wall is preferably attached to a movable carriage. As a result of the movability of the at least one end wall, the introduction of the mould core into the outer mould is simplified since the mould core can initially be introduced and then the centering and/or holding means (in particular centering pins) for the mould core can be introduced into the mould core at the inner side of the at least one end wall and then the mould core is held on the inner side at the end walls. Thereafter, the side walls can be folded up and fixed to the end walls.

The outer mould can preferably be closed on the face side by end walls, wherein the end walls preferably have respective means for centering the mould core.

The mould and/or the outer mould is preferably configured in such a way that the concrete pipe can be moulded corresponding to the subsequent installation position of the concrete pipe, wherein the bottom part is preferably formed as a negative mould of the concrete pipe base on the bottom side of the concrete pipe.

In the horizontal production of concrete pipes having a base (so-called base pipes) in the upside down installation position, as shown in FIG. 2, for example, and as known from WO 2009/112248 A2, by means of moulding in a trough formwork, it is extremely difficult to give the base of the concrete pipe a precise shape since for perfectly moulding the pipe base it is necessary to uniformly pour in the concrete. Thus, it is also necessary to bring the mould into a perfectly horizontal position after the pouring off step. If the mould does not have a perfectly horizontal position, the concrete can run in such a way that a disadvantageously non-uniform base shape is obtained. When the concrete pipe is subsequently laid, pipe bases having a non-uniform shape can result in an offset between the pipes, which considerably complicates the installation.

These drawbacks can advantageously be avoided by pouring off the base pipe corresponding to the subsequent installation position, i.e. with the subsequent base of the base pipe facing downwards, since a bottom part of the outer mould can be formed as a precise negative mould of the base of the base pipe. A perfectly horizontal orientation of the outer mould is thus not necessary since the orientation of the outer mould does not influence the base but the apex of the pipe, wherein the apex shape of the pipe has no essential influence on the functioning of the concrete pipe. A region which is suitable to serve as a filling balance is thus advantageously formed at the apex of the concrete pipe, wherein a much higher filling tolerance is enabled in this region since this region is irrelevant, or at least plays a minor role, for the installation and the functioning of the pipe. In the case of an outer mould having is folding side walls where the base pipe is poured off in accordance with the subsequent installation position, it is thus advantageously possible to create such a filling balance for the concrete at the apex or ridge of the concrete pipe so as to create a tolerance range by means of which the expenditure with respect to the uniformity and the accurate dosage can be reduced when the concrete is poured in. By contrast, a trough mould in which the concrete pipe is poured in an upside down position requires a more complicated, precisely dosed and uniform pouring step.

Thus, a precise moulding of the pipe base can advantageously be ensured in a simple way with an outer mould having folding side walls, in which the concrete pipe is moulded in accordance with the subsequent installation position. In particular, an advantageous self-supporting position in the centre of the base, which improves the statics and the installation, can be introduced with the outer mould having folding side walls, in which the base pipe is poured off in accordance with the subsequent installation position, in a simple way by means of a suitable design of the bottom part acting as a negative mould of the pipe base. It is in particular advantageously possible to provide the base of the concrete pipe with recesses (e.g. self-support in the centre of the base for optimized statics or also a chamfer on the face side of the base for a facilitated assembly since when two pipes are pushed together less foundation material is inserted and/or inserted material is placed under the chamfer).

Furthermore, in an outer mould which has folding side walls and in which the concrete pipe is moulded corresponding to the subsequent installation position it is no longer disadvantageous when depending on the concrete formulation a soft zone consisting of slurries and entrapped air is formed on the top side of the feeding-in gate since in contrast to a trough mould in which the concrete pipe is moulded in an upside down position it is no longer formed at the base of the pipe but in the area of the filling balance at the apex of the pipe.

In addition, in an outer mould which has folding side walls and in which the concrete pipe is moulded in accordance with the subsequent installation position, the introduction of two-part reinforcements can be facilitated. For example, if a mat shall be introduced at the pipe base and/or a mat having a U-shape shall be introduced above the plastic inner pipe, this process can be simplified with the proper installation position compared to the upside down position since in the inverted U-shape the mat can be introduced into the outer mould around the plastic inner pipe from above after the plastic inner pipe including the mould core has already been installed.

When the outer mould is closed, the side walls preferably approach towards the top side of the outer mould in such a way that between the upper longitudinal edge portions of the side walls an elongate gap is formed through which concrete, in particular self-compacting concrete, can be poured.

The side walls are preferably formed in such a way that the cross section of the outer mould widens from the bottom part to a middle portion of the side walls and tapers from the middle portion of the side walls to the top side of the outer mould. Thus, the base of the concrete pipe can have a narrower design so as to save material and thus costs.

The two upper longitudinal edge portions of the side walls are preferably formed in such a way that in the gap between the two upper longitudinal edge portions of the side walls a filling volume acting as a filling balancing region for concrete is provided when the outer mould is closed. Such a filling balancing region advantageously enables a reduction of the expenditure regarding the dosage of the concrete since the filling amount does not have to be dosed accurately. The filling balancing region provides for a tolerance range which permits minor deviations as regards the concrete dosage. When the concrete is poured in, concrete is poured into the outer mould until the outer mould is filled up to the filling balancing region. If somewhat more concrete than the target volume is poured in, the excess concrete is accommodated in the filling balancing region. In this way, a somewhat raised ridge is optionally formed on the top side of the concrete pipe. However, said ridge does not influence the function and quality of the concrete pipe produced. Therefore, it is not necessary to accurately dose the concrete filling amount as required when outer moulds where the concrete pipe is moulded in a position upside down relative to the installation position are used, for example.

The end walls and/or the side walls of the outer mould preferably have means, in particular tension lever locks, for fixing the side walls to the end walls when the outer mould is closed. Here, the ends of each of the side walls preferably have means, in particular tension lever locks, for fixing the side walls to the end walls, wherein in the closed state the side walls are fixed to the end walls by the means, in particular tension lever locks, for fixing the side walls to the end walls. In particular, the side walls can preferably be locked by tensioning means in the closed state of the outer mould, said tensioning means meshing with the respective end walls. Thus, the side walls and end walls can be fixed to each other in a simple and stable way after the side walls have been folded up and before the concrete is poured into the outer mould.

The above-mentioned aspects and features of the present invention can partially and fully be combined. Further aspects, features and advantages of the present invention can be taken from the following detailed description of preferred embodiments and the detailed description of the figures.

BRIEF DESCRIPTION OF THE FIGURES

FIG. 3 schematically shows a longitudinal section through a concrete pipe which comprises a basic body made of concrete and a plastic inner pipe and which accommodates a one-part mould core according to a method for producing the concrete pipe according to the prior art.

FIG. 4 schematically shows a longitudinal section through a concrete pipe which comprises a basic body made of concrete and a plastic inner pipe and which accommodates a two-part mould core according to a first embodiment of the manufacturing method according to the present invention.

FIG. 5 schematically shows a longitudinal section through a concrete pipe which comprises a basic body made of concrete and a plastic inner pipe and which accommodates a three-part mould core according to a second embodiment of the manufacturing method according to the present invention.

FIG. 6A and FIG. 6B schematically show examples of a cross section through a concrete pipe produced in a horizontal fashion in a trough formwork according to an embodiment of the manufacturing method according to the present invention.

FIG. 7A and FIG. 7B schematically show examples of a cross section through a concrete pipe produced in a vertical position in a vertical outer mould or in a horizontal fashion in a multi-part trough formwork according to embodiments of the manufacturing method according to the present invention.

FIG. 8A and FIG. 8B schematically show examples of a cross section through a concrete pipe made in a vertical position in a vertical outer mould according to an embodiment of the manufacturing method according to the present invention.

FIG. 9A to FIG. 9c schematically show the development of widening a plastic inner pipe for forming a widening by means of a mould core part of the multi-part mould core according to a preferred embodiment of the manufacturing method according to the present invention.

FIG. 12A to FIG. 12D schematically show a top view, a perspective view, a front view and a side view of a y-shaped knob on the outer surface of the plastic inner pipe with two cross webs according to an embodiment of the present invention. FIG. 12E and FIG. 12F schematically show cross sections of the y-shaped knob with two cross webs.

FIG. 13A to FIG. 13D schematically show a top view, a perspective view, a front view and a side view of a v-shaped knob on the outer surface of the plastic inner pipe with a cross web according to an embodiment of the present invention. FIG. 13E and FIG. 13F schematically show cross sections of the v-shaped knob with a cross web.

FIG. 18A shows a sectional view along the section plane A-A from FIG. 17B, and FIG. 18B shows a detailed view of section G of FIG. 18A.

FIG. 19 shows an exemplary diagrammatic front view of the outer mould of FIG. 16.

DETAILED DESCRIPTION OF PREFERRED EMBODIMENTS OF THE INVENTION WITH REFERENCE TO THE FIGURES

Figure 1:
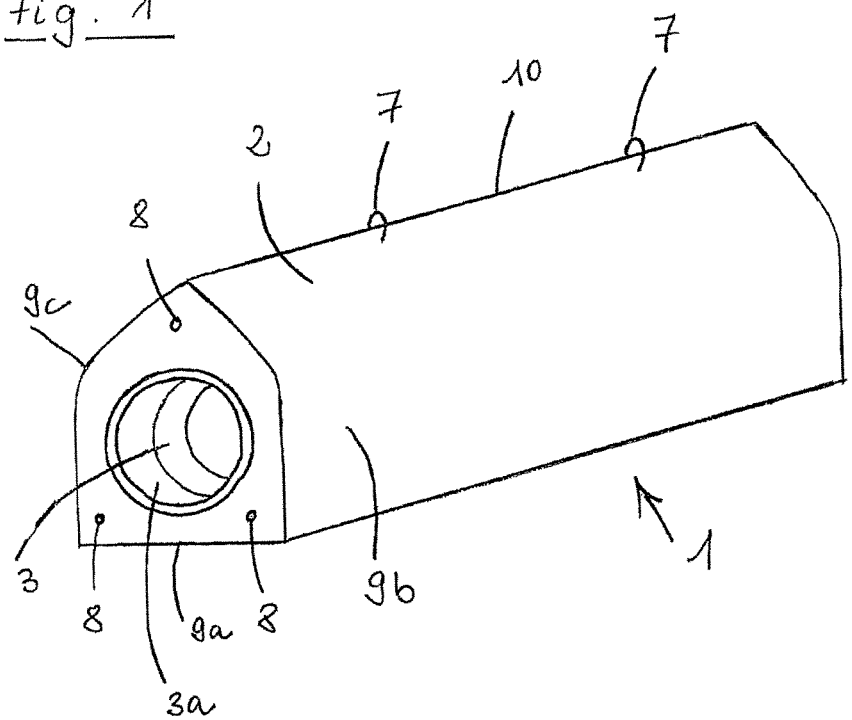
FIG. 1 schematically shows a perspective view of a concrete pipe which comprises a basic body made of concrete and a plastic inner pipe and is intended for conducting a liquid.

The subject matter of the present invention relates to a method for producing a concrete pipe 1 which is intended for conducting a liquid, as shown in FIG. 1 by way of example. The concrete pipe 1 comprises a basic body 2 made of concrete and a plastic inner pipe 3 for protecting the concrete basic body 2 against corrosive effects caused by the liquid to be conducted, e.g. acidic waste water. Above the flow area of the waste water, such plastic inner pipes especially provide protection against acidic gases forming in the waste water, depositing acids (e.g. biogenic sulphuric acids) and bacteria which settle on the inner walls and could otherwise attack the inner surface of the concrete above the waste water. The same or similar structural and/or functional features or subject matters bear the same reference signs in different figures.

The concrete pipe 1 is produced in a concrete moulding method, wherein a mould core 4 is introduced into the plastic inner pipe 3, the plastic inner pipe 3 is introduced, in particular optionally with an introduced mould core 4, into an optionally multi-part outer mould 5 which is put together and which is adapted to the desired outer mould of the concrete pipe 1. The concrete pipe 1 in FIG. 1 has by way of example a straight bottom side 9a and lateral sides 9b and 9c, which are bent towards a ridge 10 of the concrete pipe 1. The straight bottom side 9a of the concrete pipe 1 is particularly advantageous since the concrete pipe 1 offers a straight support surface when laid with the bottom side 9a, said support surface facilitating the orientation and centering when several concrete pipes 1 are put together to form a concrete pipe conducting system. According to a particularly advantageous embodiment of the present invention, the concrete pipe 1 is made in a horizontal fashion, wherein the outer mould 5 is formed by a trough formwork. However, the concrete pipe 1 can also be made in a vertical fashion in a vertical outer mould. The plastic inner pipe 3 can be formed of a thin plastic film, for example, which is welded to give the plastic inner pipe 3.

The plastic inner pipe 3 can be introduced e.g. into a one-part or multi-part outer mould or also into a multi-part out mould which still has to be put together or a multi-part outer mould which has partially been put together. For example, it is possible to use a trough formwork having separate end plates, wherein for the face-side closure the end plates are attached to the trough formwork before concrete is poured in, e.g. by closing the trough formwork by means of the end plates after the plastic inner pipe 3 has been introduced. When a multi-part outer mould 5 is used, the step of introducing the plastic inner pipe 3 into the outer mould can also be carried out in particular by not directly introducing the plastic inner pipe 3 into the multi-part outer mould but by putting together the outer mould around the plastic inner pipe 3. When a trough formwork is used, the trough formwork can be closed on the face side by end walls in the step of introducing the plastic inner pipe 3 into an outer mould 5, wherein each end wall can advantageously have means for centering the mould core.

When the concrete pipe 1 is produced, concrete is poured into an intermediate space between the outer mould 5 and the plastic inner pipe 3 for moulding the basic body 2 after the plastic inner pipe 3 has been introduced. For this purpose, flowable, self-compacting concrete is used according to a preferred embodiment of the present invention. It is also possible to use non-self-compacting concrete, wherein the compaction of the concrete is then effected by vibration processes. The plastic inner pipe 3 is left in the basic body 2 made of concrete as an inner formwork after the concrete has solidified and the mould core 4 is removed again after the concrete has at least partially solidified and thus can be reused, where appropriate.

According to the invention, the method for producing a concrete pipe 1 uses a multi-part mould core 4. FIG. 4 shows by way of a diagram a longitudinal section through a concrete pipe 1 into which a two-part mould core 4 according to a first preferred embodiment of the manufacturing method has been introduced according to the present invention. Here, the mould core 4 comprises a first mould core part 4a and a second mould core part 4b. FIG. 5 schematically shows a longitudinal section through a concrete pipe which comprises a basic body made of concrete and a plastic inner pipe and in which a three-part mould core 4 is introduced according to a second preferred embodiment of the manufacturing method according to the present invention. Here, the mould core 4 comprises along with an outer, first mould core part 4a and an outer, second mould core part 4b additionally a middle or inner, third mould core part. However, the present invention is not limited to embodiments having two-part or three-part mould cores and it is possible to use multi-part mould core parts, e.g. by further subdividing the mould core parts 4a, 4b and 4c, which are shown in FIGS. 4 and 5.

FIGS. 4 and 5 illustrate that the plastic inner pipe 3 has an inner section 3c and, at both ends, respective widened sections 3a and 3b, wherein the outer widened sections 3a and 3b have, according to the invention, a larger cross section than the inner section 3c. According to a preferred embodiment, the cross sections of the widened sections 3a and 3b and the cross section of the inner section 3c are respectively expanded in a substantially circular fashion and the widened sections 3a and 3b are radially expanded relative to the cross section of the inner section 3c of the plastic inner pipe. The widened sections 3a and 3b here serve for receiving intermediate sleeves and/or inner pipe sockets when two concrete pipes 1 are put together on the face sides.

FIGS. 4 and 5 also show that the mould core 4 is adapted to the shape of the plastic inner pipe 3 in such a way that an inner section of the mould core 4 substantially has a cross section corresponding to the cross section of the inner section 3c of the plastic inner pipe 3 and the outer sections of the mould core 4 substantially have a cross section corresponding to the cross section of the widened sections 3a and 3b at the ends of the plastic inner pipe 3.

In the first embodiment according to FIG. 4, the mould core 4 is formed in two parts and each of the two outer mould core parts 4a and 4b of the two-part mould core 4 comprises an outer section each, which has a cross section substantially corresponding to the respective widened sections 3a or 3b of the plastic inner pipe 3. Furthermore, each of the mould parts 4a and 4b has an inner section corresponding to the inner section of the mould core 4 which has a cross section substantially corresponding to the cross section of the inner section 3c of the plastic inner pipe. Thus, the mould core 4 which is composed of the two mould core parts 4a and 4b is adapted along its entire length substantially to the cross section of the plastic inner pipe 3, including the widened regions 3a and 3b of the plastic inner pipe 3, which are radially expanded on the end sides. In particular, the inner section of the mould core 4 in FIG. 4 is substantially formed as a section of the second outer mould core part 4b, i.e. the second mould core part 4b is longer than the first mould core part 4a. The advantage is that the joining surface of the two mould core parts 4a and 4b in FIG. 4 does not occur in the centre of the mould core 4. Thus, the second mould core part 4b can compensate for the lifting forces which are created by the concrete poured into the outer mould and which are particularly intense in the centre of the plastic inner pipe, in a particularly good way and can support the plastic inner pipe 3 in a dimensionally stable way so that even when the plastic inner pipe wall is very thin the cross section of the inner section 3c of the plastic inner pipe 3 is not deformed.

In the second embodiment according to FIG. 5, the mould core 4 is formed in three parts and each of the two outer mould core parts 4a and 4b of the three-part mould core 4 comprises one outer section each, which has a cross section substantially corresponding to the respective widened sections 3a or 3b of the plastic inner pipe 3. Furthermore, each of the outer mould parts 4a and 4b has a short inner section corresponding to the inner section of the mould core 4 which has a cross section substantially corresponding to the cross section of the inner section 3c of the plastic inner pipe. The middle, third mould core part 4c substantially has a cross section along its entire length which corresponds to the cross section of the inner section 3c of the plastic inner pipe 3. Thus, the mould core 4 which is composed of the three mould core parts 4a, 4b and 4c is substantially adapted along its entire length to the cross section of the plastic inner pipe 3, including the regions 3a and 3b of the plastic inner pipe 3, which are radially expanded on the end side.

The middle, third mould core part 4c forms in FIG. 5 substantially the entire inner section of the mould core 4. The advantage is that the middle mould core part 4c can particularly well compensate for the lifting forces which are created by the concrete poured into the outer mould and which are particularly intense in the centre of the plastic inner pipe and can support the plastic inner pipe 3 in a dimensionally stable fashion so that even when the plastic inner pipe wall is very thin the cross section of the inner section 3c of the plastic inner pipe 3 is not deformed.

In order to facilitate the introduction of the third mould core part 4c into the plastic inner pipe 3 and also the removal, i.e. the removal of the mould core from the at least partially solidified concrete pipe, the third mould core part 4c can have a slightly tapering shape towards one end, e.g. by providing it with a substantially conical shape or with at least a conically shaped portion. This applies likewise to the inner section of the mould core part 4b in FIG. 4. In addition, a tapering, e.g. conical or cone-shaped introductory aid mould part can be fixed to the middle mould core part 4c in FIG. 5 and/or to the mould core part 4b in FIG. 4 to facilitate the introduction into the plastic inner pipe 3. The introductory aid mould part can be removed again after the respective mould core part has been introduced, optionally before further mould core parts of the mould core are introduced. Such an introductory aid mould part can thus be used as an "insertion aid".

In the two embodiments according to FIG. 4 and FIG. 5, the inner sections of the outer mould core parts 4a and 4b have a respective cross section substantially corresponding to the cross section 3c of the plastic inner pipe 3 and thus have to be counted among the inner section of the mould core according to the above definition. The inner section of the mould core 4 is thus formed in this case from sections of different mould core parts. For example, in FIGS. 4 and 5 the sections of the outer mould core parts 4a and 4b, which belong to the inner section, merge in a further section of the outer mould core parts 4a and 4b, which border on the inner section, continuously, in particular conically, into the respective outer section of the outer mould core parts 4a and 4b.

In FIGS. 4 and 5, the mould core parts 4a and 4b or 4a, 4b and 4c are shown by way of examples as solid bodies each. However, the present invention is not limited to the use of multi-part mould cores having solid body mould core parts. The mould core parts can rather be made as stable hollow bodies. In addition, the mould core parts can be composed of various parts or made of a single part.

FIG. 6A and FIG. 6B schematically show cross sections through concrete pipes 1 which are made in a horizontal fashion in a trough formwork and which have a substantially straight bottom side 9a similar to the concrete pipe 1 of FIG. 1 according to an embodiment of the manufacturing method according to the present invention. Here, the inner pipe cross section (i.e. the cross section of the plastic inner pipe 3) in FIG. 6a is e.g. circular and in FIG. 6B it is oval by way of example. The present invention is not limited to these inner pipe cross sections and any known inner pipe cross section shape can be made according to the invention. An oval inner pipe cross section is particularly advantageous for waste water pipes in dry countries since under ordinary weather conditions only very little waste water is conduced. In an oval inner pipe cross section, the cross section tapers downwardly so that in spite of the small amount of waste water (reduced conduction of water) a sufficient flow rate and/or a sufficient level can be obtained to still move along the dirt load. When the water level is high, e.g. as a result of heavy rain, a high amount of water can be managed due to the oval cross section.

Figure 2:
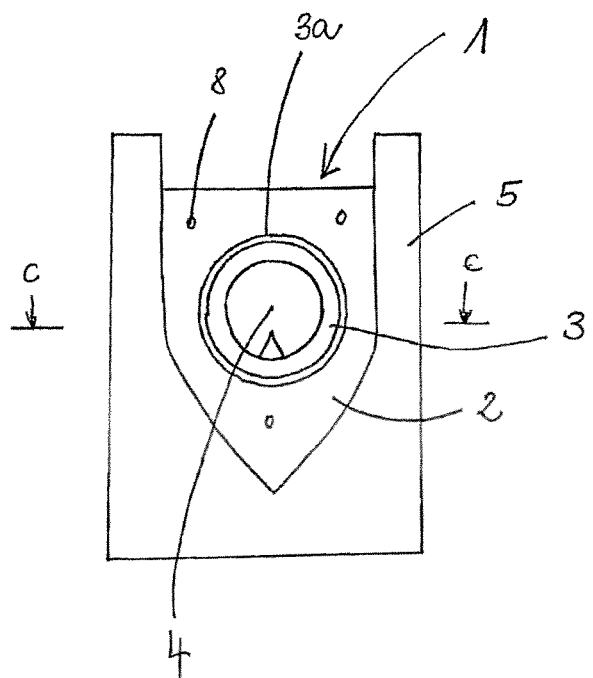
FIG. 2 schematically shows a top view of a concrete pipe in an outer mould according to a method for producing the concrete pipe according to the prior art.

FIG. 7A and FIG. 7B schematically show cross sections through concrete pipes 1 which are made in a horizontal position in a trough formwork and which have a substantially straight bottom side 9*a* similar to the concrete pipe 1 of FIG. 1 according to an embodiment of the manufacturing method according to the present invention. Here, the inner pipe cross section (i.e. the cross section of the plastic inner pipe 3) in FIG. 7A is e.g. circular and in FIG. 7B it is oval by way of example. Since according to FIGS. 7A and 7B the side walls 9*a* and 9*b* of the concrete pipes 1 taper towards the bottom side 9*a*, wherein the bottom side 9*a* is in the top position in the trough formwork during the moulding step (cf. with the example of FIG. 2), it is here necessary to use a trough formwork where side walls of the trough formwork can be removed for the purpose of removal after the concrete has at least partially solidified to be able to remove the concrete pipe 1 from the trough formwork.

As described above, a concrete pipe according to a further embodiment of the present invention can also be made in a vertical position in a vertical outer mould. For example, concrete pipes 1 having cross sections according to FIGS. 6A to 7B can also be made in a vertical position in a vertical outer mould. The production in such a vertical method is e.g. advantageous in particular when before the concrete is poured in, a reinforcement is additionally inserted between the outer mould and the plastic inner pipe to stabilise the subsequent basic body 2 from within by a framework, for example. The vertical manufacture is particularly also suited for the production of advancing pipes which must have a substantially circular outer cross section of the basic body 2 so as to be insertable in circular bores in the ground by advancement. FIG. 8A and FIG. 8B schematically show cross sections through concrete pipes 1 which are made in a horizontal position in a horizontal outer mould and whose basic body 2 has a substantially circular outer cross section, in particular advancing pipes, according to an embodiment of the manufacturing method according to the present invention. Since the concrete pipes 1 shown in FIGS. 8A and 8B are advancing pipe by way of example, the cross section of the basic body 2 made of concrete is larger compared to the cross section of the respective plastic inner pipe to distribute the high loads occurring when the pipes are laid as a result of the advance. The inner pipe cross section (i.e. the cross section of the plastic inner pipe 3) is e.g. circular in FIG. 8A and it is oval in FIG. 8B by way of example.

In the above described, vertical manufacturing method, a concrete pipe 1 is preferably produced in excessive length, and the method preferably comprises a further step of cutting the concrete pipe 1 to a desired length by cutting off an upper projecting section of the concrete pipe 1. A projecting section of the concrete pipe 1 or a projecting section of the basic body 2 made of concrete is separated in which gas or air bubbles which rose in the concrete have collected.

According to a particularly preferred embodiment of the manufacturing method according to the present invention, the widened sections 3*a* and 3*b* are thermoplastically formed or moulded at the ends of the plastic inner pipe 3 directly in the step of introducing the mould core 4 into the plastic inner pipe 3 by means of introducing one or more outer mould core parts of the mould core 4, e.g. by introducing the outer mould core parts 4*a* and 4*c* of FIG. 4 or 5. For this purpose, the plastic inner pipe 3 can have a substantially constant cross section before the mould core 4 is introduced into the plastic inner pipe 3 and therefore widened sections 3*a* and 3*b* having a radially expanded cross section are not yet formed in the plastic inner pipe 3 before the mould core 4 is introduced. In the step of introducing the mould core 4 into the plastic inner pipe 3, the widened sections 3*a* and 3*b* can then be formed at the ends of the plastic inner pipe 3 when the outer mould core parts 4*a* and 4*b* of the mould core 4 are introduced.

As shown by way of example and by way of diagram in FIGS. 9A to 9C for the second embodiment having a three-part core according to FIG. 5, the step of introducing the mould core 4 into the plastic inner pipe 3 according to a particularly preferred embodiment of the manufacturing method according to the present invention, comprises a step of introducing the inner section of the outer mould core part 4*a* into the plastic inner pipe 3 at one end of the plastic inner pipe 3, optionally when at least a three-part mould core is used after the middle third mould core part 4*c* has been introduced into the plastic inner pipe (see FIGS. 9A to 9B). Before the sections of the mould core part 4*a* having a radially expanded cross section are further introduced, at least the end of the plastic inner pipe 3 into which the inner section of the mould core part 4*a* is introduced, is heated to become thermoplastically deformable in this area. Here, the material of the plastic inner pipe 3 is a thermoplastic material. The already introduced inner section of the mould core part 4*a* here advantageously prevents that the heated end of the plastic inner pipe 3 collapses and/or contracts. As shown in FIG. 9B, the plastic inner pipe 3 is heated at the end preferably on the outer side by irradiation with heat and/or optionally by external supply of hot air. However, it is also possible to provide the heating by internal irradiation with heat and/or internal supply of hot air or provide a mould core part 4*a* comprising heating means with which the end of the plastic inner pipe 3 can be internally heated.

After the end of the plastic inner pipe 3 has become thermoplastically deformable by heating, the outer mould core part 4*a* is farther introduced into the plastic inner pipe 3, thus radially expanding the end of the plastic inner pipe 3. The widened section 3*a* is here moulded directly by the introduction of the outer mould core part 4*a*, as shown in FIG. 9C. Therefore, the widened section 3*a* does not have to be prefabricated in a complicated way but can be combined in a particularly efficient and accurate way directly with the step of introducing the mould core 4 for the concrete moulding step. In addition, the shape of the widened section 3*a* is adapted in such a method with special accuracy to the shape or the outer mould core part(s) and/or the outer mould core part(s) is/are adapted with special accuracy to the shape of the widened section 3*a*. This provides a particularly good sealing effect during the concrete moulding step and it is not necessary to use further sealing means at the end portions of the plastic inner pipe 3.

Figure 10:
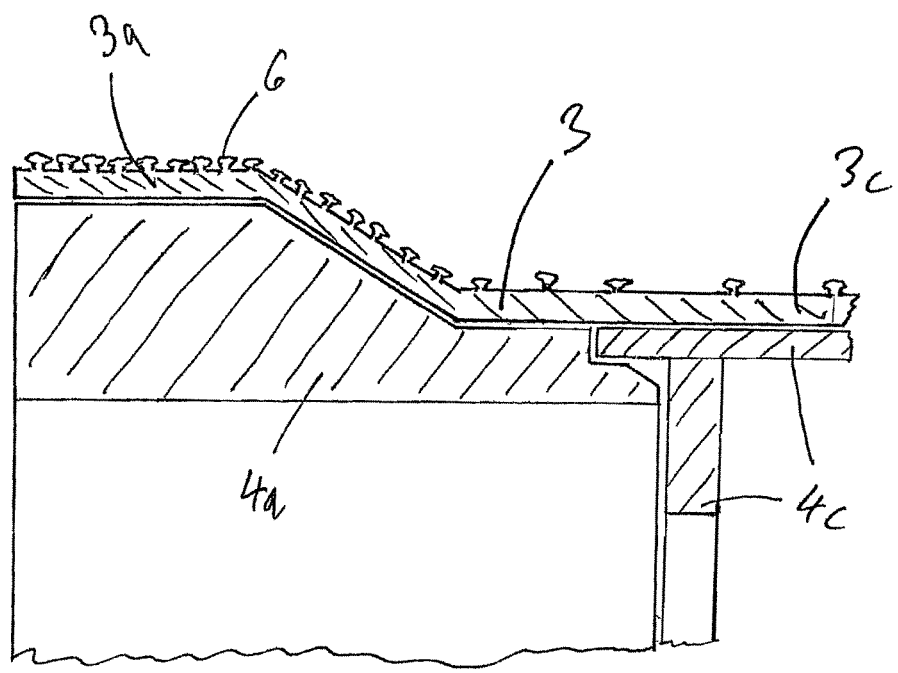
FIG. 10 schematically shows a section of a longitudinal section of an end of the plastic inner pipe according to an embodiment of the present invention.

According to a further embodiment of the invention, the plastic inner pipe 3, as shown by way of diagram in FIG. 10, has a plurality of knobs 6 on the outer surface to anchor the plastic inner pipe 3 after the concrete has at least partially solidified and in particular before the mould core 4 in the basic body 2 made of concrete is removed. During the concrete moulding step, the knobs 6 are enclosed by concrete and then firmly anchored at or in the basic body 2 as a result of the solidification of the concrete. Due to the anchorage of the knobs 6 in the basic body 2 made of concrete, the plastic inner pipe 3 is kept in a dimensionally stable fashion in the interior of the concrete pipe 1. In principle, the anchorage of a plastic inner pipe 3 by means of knobs 6 is known from the prior art (see e.g. page 1 of WO 2009/112248 A2).

However, according to the preferred embodiment of FIG. 10, a plastic inner pipe 3 is used which in the area of the ends, in particular in the area of the widened sections 3a and 3b, has a greater knob denseness than in the area of the inner section 3c. The term knob denseness here does not refer to the material density of the individual knobs 6 but to the number of knobs per unit area on the outer surface of the plastic inner pipe 3 and/or on the side of a plastic film from which the plastic inner pipe 3 is subsequently made following cutting by welding.

In the very region of the widened sections of the plastic inner pipe 3, a back-formation force acts on the knobs 6 optionally on account of the moulding of the widened sections 3a and 3b by means of the outer mould core parts in particular when the widened sections 3a are not formed by thermoplastic deformation but in a purely mechanical way. It can be balanced in a better way by increased knob denseness in the region of the widened sections. When the widened sections 3a and 3b of the plastic inner pipe 3 are thermoplastically moulded, an increased knob denseness offers in the area of the widened sections 3a and 3b the further advantage that the cross section of the plastic inner pipe 3 can be maintained with special accuracy in the very region of the openings of the plastic inner pipe 3 after the mould core parts of the mould core 4 have been removed such that dimensionally adapted intermediate sleeves and/or inner pipe sockets can be accurately fitted even after a prolonged storage of the concrete pipes 1 when two concrete pipes are put together. As a result of the reduction of the outer knob denseness in the area of the inner section 3c of the plastic inner pipe 3, material can advantageously be saved.

Figure 11A:
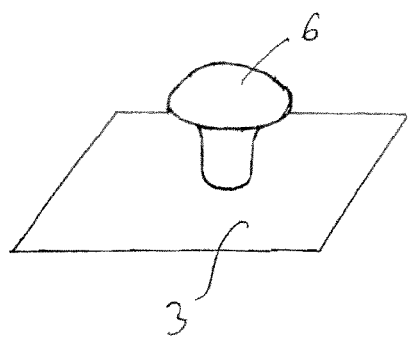
FIG. 11A schematically shows a perspective view of a knob which has the shape of a mushroom on the outer surface of the plastic inner pipe according to an embodiment of the present invention, and FIG. 11B schematically shows a cross section of the mushroom-shaped knob.
Figure 11B:
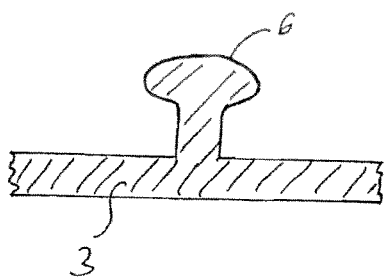

According to an embodiment the knobs 6 on the outer surface of the plastic inner pipe 3 have the shape of a mushroom to enable an advantageously firm anchorage in the basic body 2. FIG. 11a schematically shows a perspective view of a mushroom-shaped knob 6 on the outer surface of the plastic inner pipe 3, and FIG. 11B schematically shows a cross section of such a mushroom-shaped knob 6.

According to a further embodiment, the knobs 6 on the outer surface of the plastic inner pipe 3 are formed in substantially v-shaped or y-shaped fashion and have one or more cross webs 6a to stabilise the outer walls of the v-shaped or y-shaped knobs 6. FIGS. 12A to 12D show by way of example and by way of diagram a top view, a perspective view, a front view and a side view of a y-shaped knob 6 on the outer surface of the plastic inner pipe 3 (by way of example with two cross webs 6a). FIGS. 12E and 12F schematically show cross sections of such a y-shaped knob 6 having two cross webs 6a. FIGS. 13A to 13D show by way of example and by way of diagram a top view, a perspective view, a front view and a side view of a v-shaped knob 6 on the outer surface of the plastic inner pipe 3 (by way of example with a cross web 6a). FIGS. 13E and 13F schematically show cross sections of such a v-shaped knob 6 having a cross web 6a.

The plurality of knobs 6 on the outer surface of the plastic inner pipe 3 can also have different shapes, e.g. various v-shaped, y-shaped, mushroom-shaped and also differently shaped knobs 6. For example, the widened sections 3a and 3b and the inner section 3c of the plastic inner pipe 3 can have differently shaped knobs 6. The knobs 6 can also be made as elongate ridges, which have a mushroom-shaped, v-shaped or also y-shaped cross section, for example. In the case of a v-shaped or also y-shaped cross section, such ridges can also have a plurality of cross webs.

The knobs 6 on the outer surface of the widened sections 3a can also advantageously serve for producing in the step of introducing the mould core 4 into the plastic inner pipe 3 by holding and/or fixing or clamping the outer knobs 6 by means of an abutment producing means at least at one end of the plastic inner pipe 3 an abutment when the plastic inner pipe 3 is fitted to one or more mould core parts (4a, 4b or also 4c) at the end of the plastic inner pipe 3 or when one or more mould core parts (4a, 4b or also 4c) are introduced into the plastic inner pipe 3 at the end of the plastic inner pipe 3.

Figure 14A:
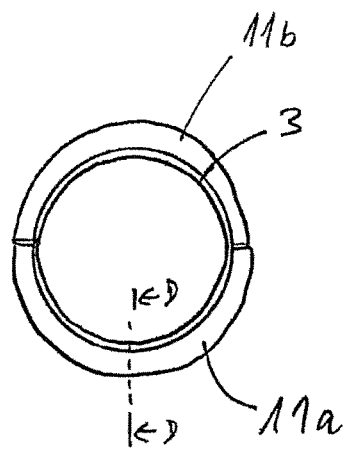
FIG. 14A schematically shows a top view of a plastic inner pipe which is held between two half moulds.

A lower half mould 11a and an upper half mould 11b are used as abutment producing means by way of example in FIG. 14A, wherein the composed half moulds 11a and 11b copy a desired cross section of the plastic inner pipe 3. FIG. 14A shows a top view of the composed half moulds 11a and 11b to which the plastic inner pipe 3 (also shown in top view) is already fixed by means of the outer knobs (not shown). However, the present invention is not limited to the use of half moulds 11a and 11b as abutment producing means, and it is also possible to use other means which are suited to fix the plastic inner pipe 3 by means of the external knobs partially or fully around the circumference of the plastic inner pipe 3.

Figure 14B:
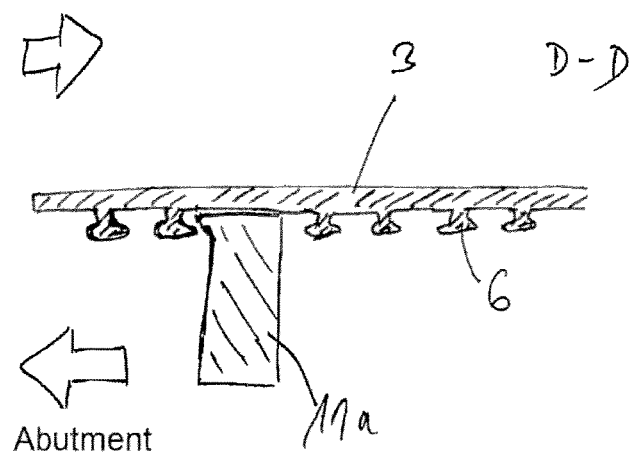
FIG. 14B schematically shows a section through the plastic inner pipe held in the lower half mould.

FIG. 14B shows by way of example a section through the lower half mould 11a along section line D-D in FIG. 14A and schematically shows that the half mould 11a is suited to be used as an abutment means which produces an abutment (corresponding to the left arrow in FIG. 14B) when one or more mould core parts shall be introduced into the plastic inner pipe 3 (corresponding to the right arrow in FIG. 14B). For this purpose, the external knob pattern on the plastic inner pipe 3 can have areas, in particular areas along the circumference of the plastic inner pipe 3, without knobs with which an abutment can mesh. The knobs in front of the meshing abutment means can then produce an abutment against the abutment producing means when mould core parts are introduced.

Figure 15:
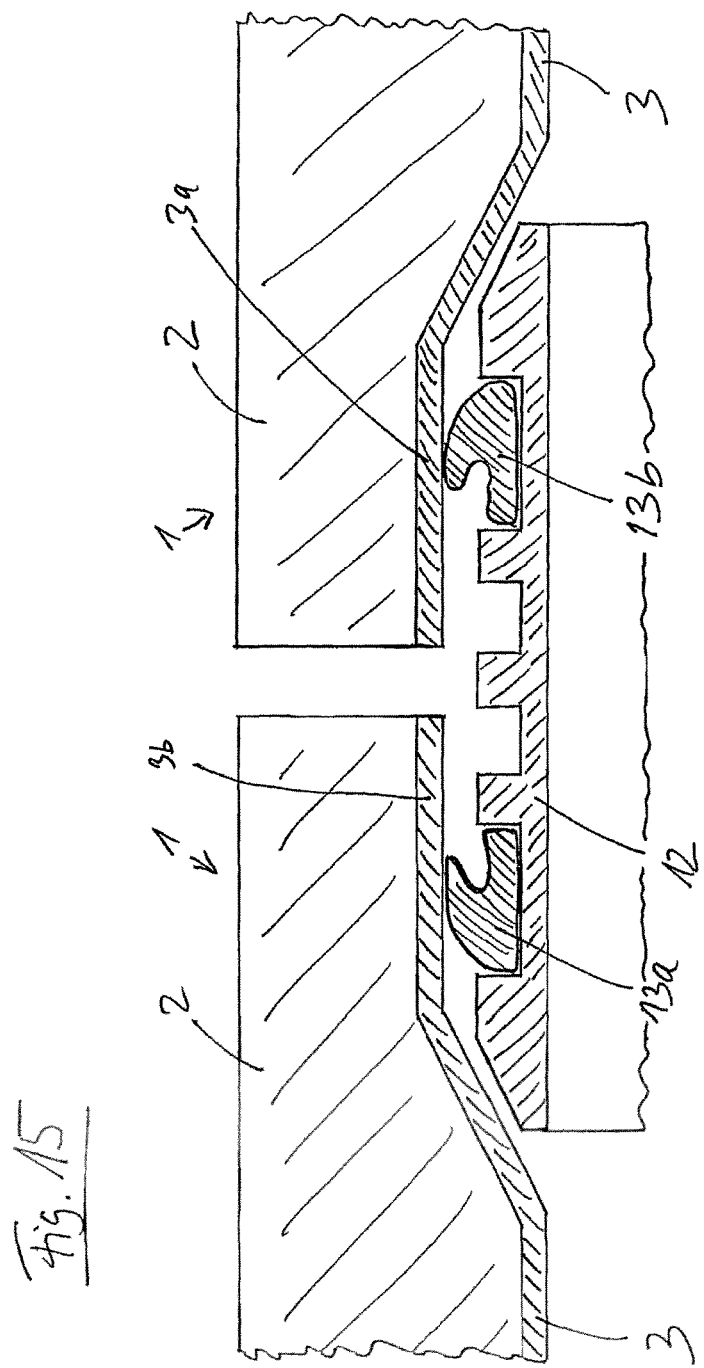
FIG. 15 schematically shows a section of a longitudinal section through the end region of two concrete pipes put together according to the present invention between which a double sleeve has been inserted.

FIG. 15 shows by way of example a section of a longitudinal section through the end regions of two concrete pipes 1 which are put together and which comprise a basic body 2 and a plastic inner pipe 3 according to an embodiment of the present invention. The concrete pipes 1 are put together at the joining ends by means of a double sleeve 12, wherein the double sleeve is fitted into the respective widened sections 3b and 3a of the concrete pipes 1. According to this particularly advantageous embodiment of the present invention, the widened sections 3a and 3b per se do not have any sealing means and thus can be made in a particularly simple way, as described above, by introducing or inserting the mould core parts. Correspondingly, the double sleeve 12 comprises sealing rings 13a and 13b for sealing the pipe interior of the pipe system from the concrete pipes outwards. In an is advantageous embodiment, as shown by way of example in FIG. 15, the inner radius or inner cross section of the double sleeve can here substantially correspond to the inner radius or inner cross section of the inner section of the plastic inner pipe. The double sleeve 12 can be welded together e.g. from an extruded plastic profile section or extruded from a plastic material in a single step.

FIG. 15 shows that the widened sections 3a and 3b have a substantially smooth inner surface without seal seats, wherein sealing rings 13a and 13b are correspondingly attached to the double sleeve 12. The production of the concrete pipes can thus be further simplified since it is not necessary to provide seal seats on the inner walls of the widened sections 3a and 3b in a complicated method.

Figure 16:
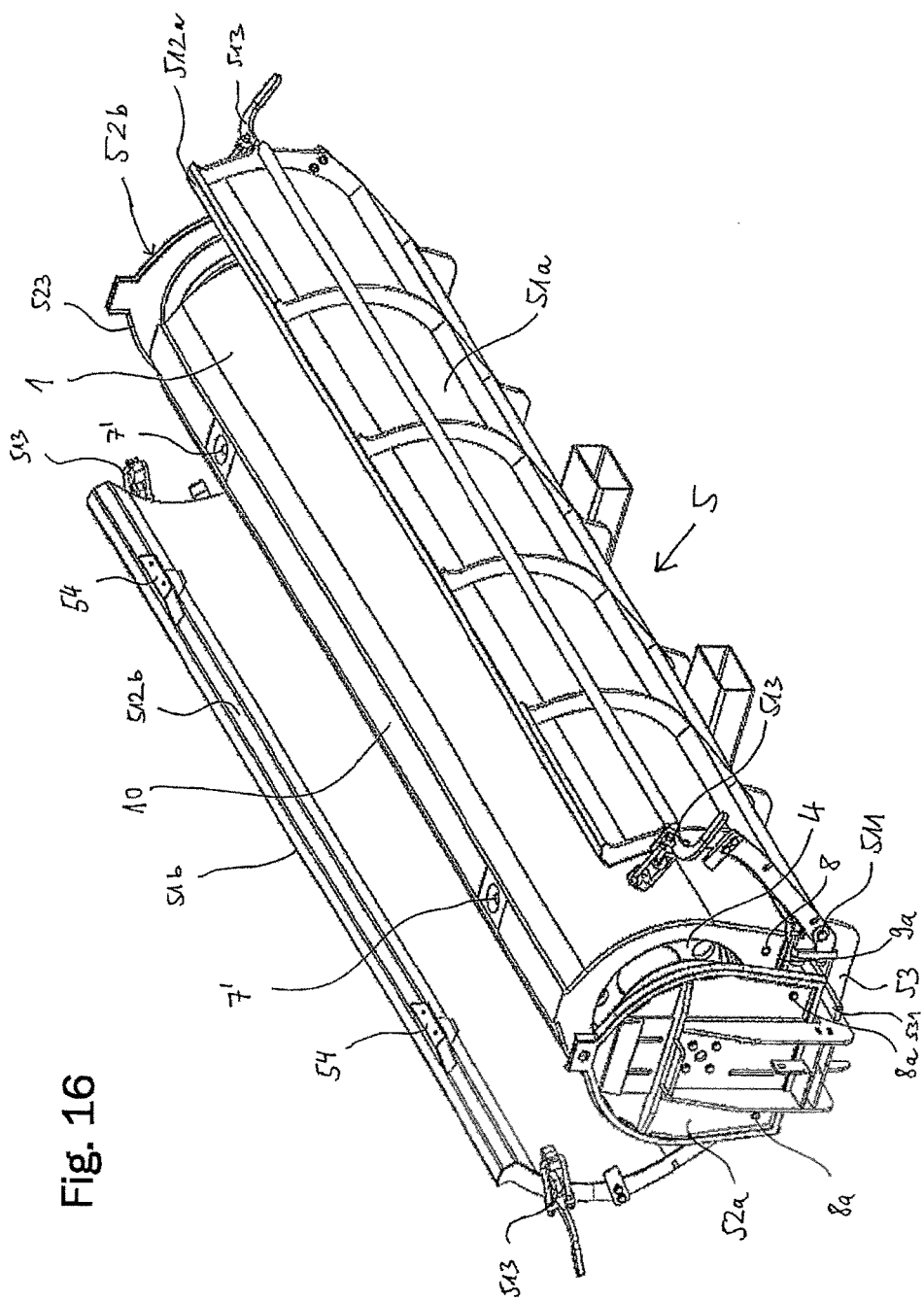
FIG. 16 shows an exemplary diagrammatic perspective view of an outer mould according to an embodiment of the present invention.

FIG. 16 shows an exemplary diagrammatic perspective view of an outer mould 5 according to an embodiment of the present invention. The outer mould 5 is a horizontal outer mould in which the concrete pipe 1 is moulded in a position corresponding to the subsequent installation position of the concrete pipe, i.e. with the concrete pipe base facing downwards. The outer mould 5 comprises two face-side end walls 52a and 52b, two side walls 51a and 51b on the long side and a bottom part 53 on the ground, at which the two side walls 51a and 51b are attached in folding manner by means of one or several hinges 511 each for opening and closing the outer mould 5. The bottom part 53 also acts as a negative mould of the concrete pipe base on the bottom side 9a of the concrete pipe 1.

The outer mould 5 can be closed on the face side by the end walls 52a and 52b and the end walls 52a and 52b comprise one lateral circumferential lip seal 523 each, which seals in the closed state of the outer mould 5. In addition, the end walls 52a and 52b comprise retainers 8a for moulds to form supports 8 for load transfer bolts on the face side of the concrete pipe 1.

FIG. 16 shows the outer mould in an open state by way of example, i.e. the side walls 51a and 51b are at least partially open and the end walls 52a and 52b are in an at least partially open position. Due to the folding side walls 51a and 51b, the outer mould as shown markedly differs from a conventional trough mould as shown in WO 2009/112248 A1, for example, i.e. from a one-part trough mould which is extensively open upwards and in which the side faces are fixed.

An at least partially solidified concrete pipe 1 is arranged in the interior of the outer mould 5 in FIG. 16. Said pipe can be removed from the outer mould. An end of the mould core 4 is visible in the interior of the concrete pipe 1. Two offset anchors 7' are moulded to the ridge 10 of the concrete pipe 1 to offset the concrete pipe in analogy to the holding strap 7 in FIG. 1 (by way of example ball-ended anchor). When concrete is poured in when the outer mould 5 is closed, the offset anchors or other support means (such as holding straps) can be held at holding means 54 (in FIG. 16 calottes 54 by way of example) which are mounted on the longitudinal edge 512b of one side wall 51b.

At the ends of the side walls 51a and 51b, tension locks 513 are arranged each by way of example, which mesh in the closed state of the outer mould with the respective end walls 52a and 52b to fix the end walls 52a and 52b to the side walls 51a and 51b. After the concrete has been poured in and the concrete has at least partially solidified, the tension locks 513 can be opened to release the fixation of the end walls 52a and 52b to the side walls 51a and 51b and to be able to open the outer mould by opening the side walls 51a and 51b. The concrete pipe can then be removed from the outer mould 5 upwards.

Figure 17A:
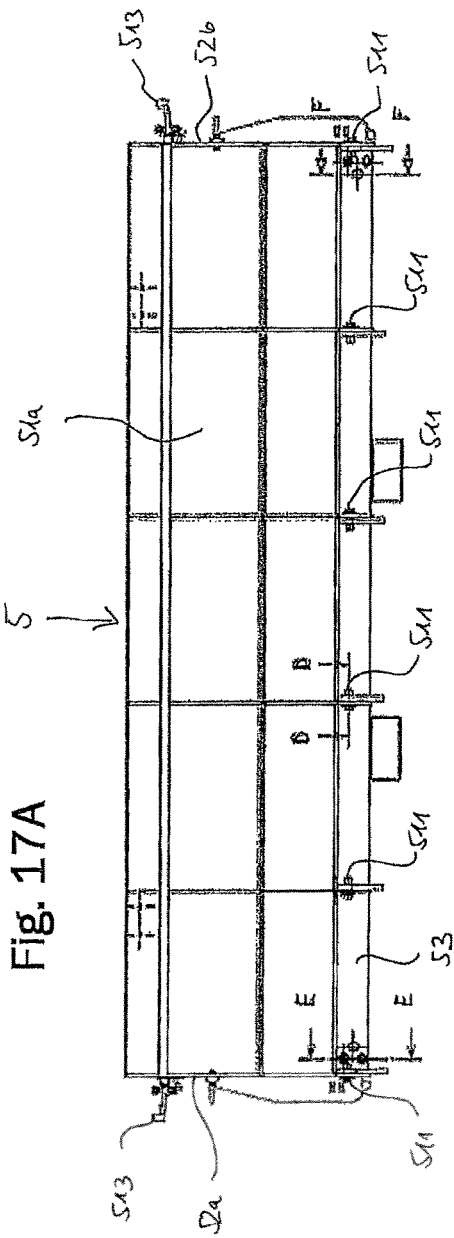
FIG. 17A shows an exemplary diagrammatic side view of the outer mould of FIG. 16.
Figure 17B:
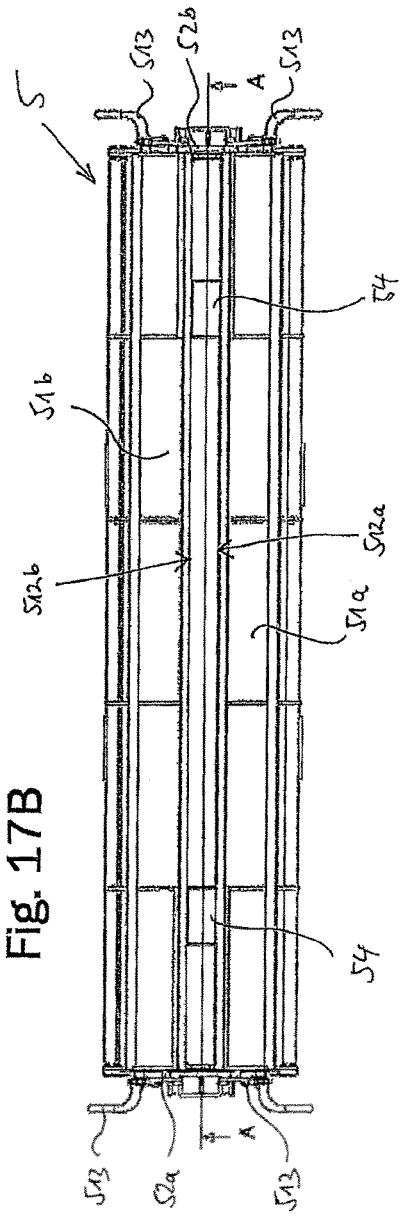
FIG. 17B shows an exemplary diagrammatic top view of the outer mould of FIG. 16.

FIG. 17A shows an exemplary diagrammatic side view of the outer mould of FIG. 16, and FIG. 17B shows an exemplary diagrammatic top view of the outer mould of FIG. 16. According to this embodiment, the side walls 51a and 51b, as shown in FIG. 17A for the side wall 51a, are attached to the bottom part 53 in a folding or tilting manner by six hinges 511. In FIGS. 17A and 17B, the outer mould 5 is shown in a closed state in which concrete can be poured in. For this purpose, there is a gap available between the upper longitudinal edges 512a and 512b of the side walls 51a and 51b, through which the concrete can be poured into the interior of the outer mould 5. In addition, a tolerance filling region is provided between the upper longitudinal edges 512a and 512b, which serves for facilitating the dosage of the concrete to be poured in since the necessary accuracy can be reduced compared to a trough mould according to FIG. 2.

FIG. 18A shows a sectional view along the section plane A-A of FIG. 17B, and FIG. 18B shows a detailed view of the section G of FIG. 18A. It is here evident that, on the inner side, the end walls 52a and 52b have means 521 for centering and holding the mould core 4. Thus, in the closed state of the outer mould 5, a mould core 4 can be oriented and held in a centred position when the face sides 52a and 52b are closed. Each of the face sides 52a and 52b is mounted on a carriage 522 so as to be opened and closed. The carriage can be supported in movable fashion on rolls 522a in the longitudinal direction of the outer mould. Thus, the end walls 52a and 52b can be moved in the longitudinal direction of the outer mould 5 to open and close the face sides of the outer mould 5.

FIG. 19 shows an exemplary, diagrammatic front view of the outer mould of FIG. 16. This front view shows that the side walls 51a and 51b are shaped in this embodiment in such a way that the cross section of the outer mould 5 from the bottom part 53 to a middle section of the side walls 51a and 51b is widened towards a maximum width of the outer mould 5 and tapers again from the middle section of the side walls 51a and 51b towards the top side of the outer mould 5. In the closed state of the outer mould 5, the side walls 51a and 51b here approach the top side of the outer mould 5 in such a way that the longitudinal gap can be formed between the upper longitudinal edges 512a and 512b of the side walls 51a and 51b, through which concrete, in particular self-compacting concrete, can be poured in.

Figure 20A:
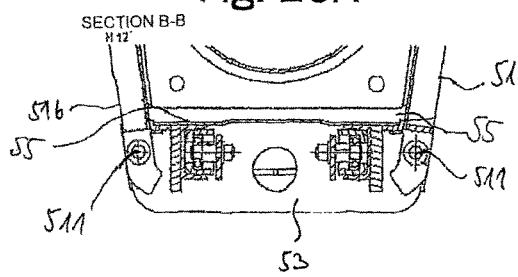
FIG. 20A shows a sectional view along the section plane B-B of FIG. 18A.
Figure 20B:
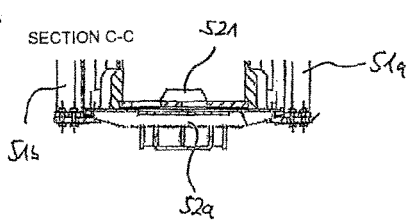
FIG. 20B shows a sectional view along the section plane C-C of FIG. 19.
Figure 20C:
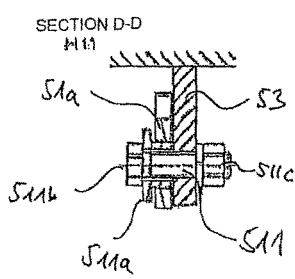
FIG. 20C shows a sectional view along the section plane D-D of FIG. 17A.
Figure 20D:
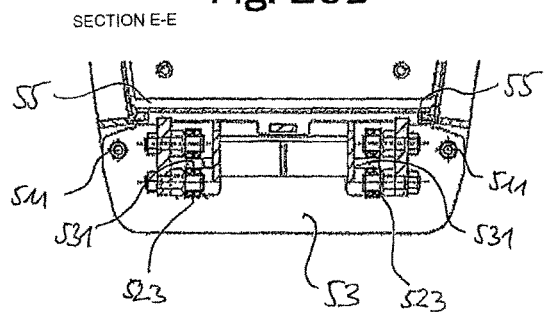
FIG. 20D shows a sectional view along the section plane E-E of FIG. 17A.
Figure 20E:
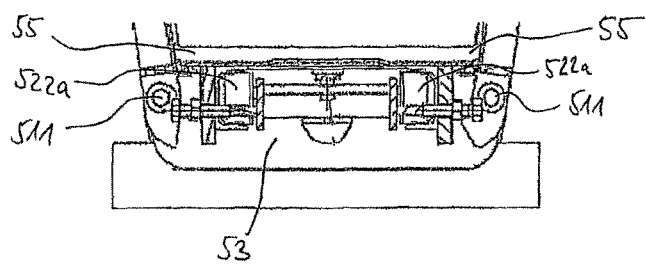
FIG. 20E shows a sectional view along the section plane F-F of FIG. 17A.
Figure 20F:
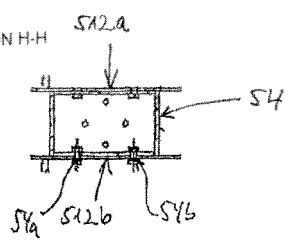
FIG. 20F shows a sectional view along the section plane H-H of FIG. 18A.

Further details of the outer mould according to the above described embodiment of FIGS. 16 to 19 are shown in the sectional views of FIGS. 20A to 20F. FIG. 20A shows a sectional view along the section plane B-B of FIG. 18A; FIG. 20B shows a sectional view along the section plane C-C of FIG. 19; FIG. 20C shows a sectional view along the section plane D-D of FIG. 17A; FIG. 20D shows a sectional view along the section plane E-E of FIG. 17A; FIG. 20E shows a sectional view along the section plane F-F of FIG. 17A; and FIG. 20F shows a sectional view along the section plane H-H of FIG. 18A.

In particular, FIGS. 20A, 20D and 20E show that a gasket 55 is provided at the bottom part 53 to seal the respective slots between the bottom part 53 and the side walls 51a and 51b.

FIG. 20C schematically shows details of a hinge 511 comprising a sleeve 511a by means of which the side wall 51a is supported in folding manner, wherein the sleeve is attached to the bottom part by means of a screw 511b and a nut 511c.

FIG. 20D shows details of the support of the carriage 522 which is guided on a rail 531 of the bottom part 53 by means of ball bearings 523 (by way of example grooved ball bearing) of the carriage 522.

FIG. 20F finally shows the support 54 for the offset anchor 7', wherein the support 54 is fixed by means of screws 54a and 54b at the longitudinal edge 512b of the side wall 52b and abuts against the longitudinal edge 512a of the side wall 52a when the outer mould 5 is closed.

In the above described embodiment, the outer mould 5 is made in a strictly mechanical fashion and can be manually operated. However, the present invention is not limited to mechanically and manually operable outer moulds. With respect to a further automation of the outer moulds, it is rather conceivable to provide further mechanical and/or additional hydraulic components which further facilitate and/or automate the setting, cleaning and/or removal steps.

In summary, the above invention provides a method for producing concrete pipes having a basic body made of concrete and a plastic inner pipe remaining in the basic body, which improves the manufacturing method for concrete pipes that is described in WO 2009/112248 A2, and which is in particular more efficient and cost-effective. According to the method for producing a concrete pipe comprising a basic body made of concrete and a plastic inner pipe, particularly durable concrete pipes having thin-walled plastic inner pipes can be produced in a particularly cost-effective and efficient way.

The invention claimed is:

1. A method for producing a concrete pipe which comprises a basic body made of concrete and a plastic inner pipe and which is intended for conducting a liquid, the method comprising:

introducing a mould core into the plastic inner pipe;

introducing the plastic inner pipe into an outer mould; and pouring concrete into an intermediate space between the outer mould and the plastic inner pipe to form the basic body made of concrete, wherein after the concrete has solidified, the plastic inner pipe remains as inner formwork in the basic body made of concrete and the mould core is removed after the concrete has at least partially solidified, and wherein the plastic inner pipe extends, as one continuous piece formed of a plastic film, from one end of the mould core to another end of the mould core, and the plastic inner pipe comprises a middle section and, at both ends, respective widened sections which have a larger cross section than the middle section;

wherein the shape of the mould core is adapted to the shape of the plastic inner pipe along the entire length of the plastic inner pipe in such a way that the mould core substantially has a cross section corresponding to the cross section of the plastic inner pipe along the entire length of the mould core from one end of the mould core to another end of the mould core, wherein:

the shape of an inner section of the mould core is adapted to the shape of the inner section of the plastic inner pipe and the inner section of the mould core substantially has a cross section corresponding to the cross section of the inner section of the plastic inner pipe, the shape of a wider first outer section of the mould core is adapted to the shape of the first widened section at one end of the plastic inner pipe and the wider first outer section of the mould core substantially has a cross section corresponding to the cross section of the first widened section at one end of the plastic inner pipe, and the shape of a wider second outer section of the mould core is adapted to the shape of the second widened section at the other end of the plastic inner pipe and the wider second outer section of the mould core substantially has a cross section corresponding to the cross section of the second widened section at the other end of the plastic inner pipe;

wherein the mould core is formed in at least two parts and a first mould core part of the at least two-part mould core comprises the wider first outer section and a second mould core part of the at least two-part mould core comprises the wider second outer section; and wherein the plastic inner pipe has a substantially constant cross section prior to the introduction of the mould core into the plastic inner pipe and introducing the mould core into the plastic inner pipe comprises, with the introduction of the mould core, moulding of the widened sections at the ends of the plastic inner pipe by introducing the wider outer sections of the mould core.

2. The method of claim 1 wherein the mould core is formed in two parts and the first mould core part or the second mould core part substantially comprises the inner section of the mould core.

3. The method of claim 1 wherein the mould core is formed in at least three parts and the inner section of the mould core further comprises at least one middle third mould core part.

4. The method of claim 1 wherein the inner section of the mould core is substantially formed as a cylinder.

5. The method of claim 1 wherein the inner section of the mould core and/or a third mould core part has a tapered conical shape.

6. The method of claim 1 wherein during introducing the mould core an introductory aid mould part is fixed to a mould core part of the mould core to introduce the mould core part into the plastic inner pipe, wherein the introductory aid mould part has a tapering shape and is removed again after the mould core part has been introduced into the plastic inner pipe.

7. The method of claim 1 wherein an inner section of the first and second mould core part respectively corresponds to an outer section of the inner section of the mould core, which in a further section of the first and/or second mould core part that borders on the inner section respectively merges continuously into the respective outer section of the first and/or second mould core part.

8. The method of claim 7 wherein introducing the mould core into the plastic inner pipe comprises:

introducing the inner section of the first mould core part into the plastic inner pipe at one end of the plastic inner pipe and/or introducing the inner section of the second mould core part into the plastic inner pipe at the other end of the plastic inner pipe;

heating the plastic inner pipe at least at one end into which the inner section of the first mould core part is introduced and/or heating the plastic inner pipe at least at the other end into which the inner section of the second mould core part is introduced; and introducing the outer section of the first mould core part into the plastic inner pipe for thermoplastically moulding the first widened section of the plastic inner pipe at one end after heating it and/or introducing the outer section of the second mould core part into the plastic inner pipe for thermoplastically moulding the second widened section of the plastic inner pipe at the other end after heating it.

9. The method of claim 8 wherein heating the plastic inner pipe at one and/or the other end of the plastic inner pipe is carried out by thermal radiation and/or supply of hot air.

10. The method of claim 8 wherein:

at least one of the inner section of the first mould core part and the inner section of the second mould core part includes a recess therein to receive its corresponding outer section; and at least one of the outer section of the first mould core part and the outer section of the second mould core part includes a protrusion that can be received by the recess in its corresponding inner section.

11. The method of claim 1 wherein the plastic film is welded into the plastic inner pipe.

12. The method of claim 11, further comprising:
cutting a plastic film subject to the cross section of the inner section of the plastic inner pipe and/or subject to a length of the concrete pipe; and
welding together the plastic film to give the plastic inner pipe.

13. The method of claim 1 wherein the outer surface of the plastic inner pipe has a plurality of knobs for anchoring the plastic inner pipe after the concrete in the basic body made of concrete has at least partially solidified before the mould core is removed.

14. The method of claim 13 wherein the frequency of occurrence of the knobs about the plastic inner pipe in the regions of the ends of the plastic inner pipe is greater than the frequency of occurrence of the knobs about the plastic inner pipe in the region of the inner section of the plastic inner pipe.

15. The method of claim 13 wherein the knobs have the shape of a mushroom or that the knobs have a substantially v-shaped or y-shaped cross section and have one or more cross webs.

16. The method of claim 13 wherein introducing the mould core into the plastic inner pipe further comprises fixing knobs arranged on the outer surface to at least one end of the plastic inner pipe for producing an abutment when the plastic inner pipe is fitted to at least one mould core part of the multi-part mould core and/or when at least one mould core part of the multi-part mould core is introduced into the plastic inner pipe at the end of the plastic inner pipe.

17. The method of claim 1 wherein the outer mould is a vertical outer mould in which the concrete pipe is produced in a vertical position.

18. The method of claim 17 wherein the concrete pipe is produced in excessive length and comprises a step of facing the concrete pipe into sections to a desired length by cutting off an upper projecting section of the concrete pipe.

19. The method of claim 1 wherein the outer mould is a horizontal trough formwork or a horizontal outer mould having folding side walls, wherein the concrete pipe is cast in horizontal fashion in the outer mould.

20. The method of claim 19 wherein the outer mould is closed on the face side by end walls during introducing the plastic inner pipe into an outer mould, wherein each of the end walls has means for centering the mould core.

21. The method of claim 1 wherein fibre concrete is used in pouring concrete into an intermediate space between the outer mould and the plastic inner pipe for forming the basic body.

22. The method of claim 1 wherein the cross section of the inner section of the plastic inner pipe is substantially circular, ellipsoidal or oval.

23. The method of claim 1 wherein the widened sections have a substantially smooth inner surface and are designed to receive an intermediate sleeve which is adapted to the cross section of the widened sections and has sealing means on the outer surface.

24. The method of claim 1 wherein the concrete pipe has an outer cross sectional shape that include a flat portion and a substantially circular portion.

25. The method of claim 1 wherein the concrete pipe has an outer cross sectional shape that includes a flat portion and a substantially oval portion.

26. The method of claim 1 wherein the concrete pipe has an outer cross sectional shape that includes a flat portion and a substantially elliptical portion.

* * * * *